US012749427B1

(12) United States Patent
Zhang

(10) Patent No.: US 12,749,427 B1
(45) Date of Patent: Sep. 29, 2026

(54) DISPLAY PANEL AND DISPLAY APPARATUS

(71) Applicant: Wuhan Tianma Microelectronics Co., Ltd., Wuhan (CN)

(72) Inventor: Wenshuai Zhang, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 19/260,272

(22) Filed: Jul. 3, 2025

(30) Foreign Application Priority Data

Apr. 1, 2025 (CN) ......................... 202510405608.0

(51) Int. Cl.
*G09G 3/20* (2006.01)

(52) U.S. Cl.
CPC ... *G09G 3/2092* (2013.01); *G09G 2310/0286* (2013.01); *G09G 2310/08* (2013.01)

(58) Field of Classification Search
CPC ....... G09G 2310/0286; G09G 2310/08; G09G 3/20; G09G 3/2092
See application file for complete search history.

(56) References Cited

U.S. PATENT DOCUMENTS

| | | | | |
|---|---|---|---|---|
| 11,721,268 B2* | 8/2023 | Lai | G09G 3/2092 | 345/204 |
| 2021/0201752 A1* | 7/2021 | Feng | G09G 3/2092 | |
| 2022/0208071 A1* | 6/2022 | Zheng | G09G 3/20 | |
| 2022/0375383 A1* | 11/2022 | Feng | G09G 3/20 | |
| 2023/0252933 A1* | 8/2023 | Guo | G09G 3/3266 | 345/55 |
| 2026/0018136 A1* | 1/2026 | Feng | G09G 3/3266 | |

FOREIGN PATENT DOCUMENTS

| | | | |
|---|---|---|---|
| CN | 112687230 | A | 4/2021 |
| CN | 115083332 | A | 9/2022 |
| CN | 118135942 | A | 6/2024 |
| CN | 118571148 | A | 8/2024 |
| CN | 118800160 | A | 10/2024 |
| CN | 118824170 | A | 10/2024 |
| CN | 118918813 | A | 11/2024 |
| KR | 20230009254 | A | 1/2023 |

OTHER PUBLICATIONS

Wuhan Tianma Micro Electronics Co Ltd English machine translation CN118571148A•Aug. 30, 2024 Zhou Shu (Year: 2024).*
The First Office Action for Chinese Application No. 202510405608.0, dated Aug. 29, 2025, 19 pages.

* cited by examiner

*Primary Examiner* — Van N Chow
(74) *Attorney, Agent, or Firm* — East IP P.C.

(57) ABSTRACT

The present application discloses a display panel and a display apparatus. The display panel includes a first driving circuit, the first driving circuit including a plurality of stages of shift register. The shift register includes: a first shift control module electrically connected to an input terminal, a first clock terminal, a first power supply terminal, a first node, a second node, and a third node; a second shift control module electrically connected the input terminal, the first clock terminal, the first node, a second power supply terminal, and a fourth node; a shift output module electrically connected to the fourth node, the second node, the first power supply terminal, the second power supply terminal, and a shift output terminal; and a potential control module electrically connected to the third node, a second clock terminal, and the second node.

20 Claims, 15 Drawing Sheets

DISPLAY PANEL AND DISPLAY APPARATUS

CROSS-REFERENCE TO RELATED APPLICATION

This application claims priority to Chinese Patent Application No. 202510405608.0, filed on Apr. 1, 2025, which is hereby incorporated by reference in its entirety.

TECHNICAL FIELD

The present application relates to the field of display technology, and in particular to a display panel and a display apparatus.

BACKGROUND

A display panel is usually provided with a plurality of pixels, and driving circuits are used to scan the pixels line by line, which enables the data signals to be written into each pixel line by line so that each pixel can display and emit light according to the received data signal, thus displaying a corresponding image.

The driving circuit is usually provided with cascaded multi-stage shift registers. The gate drive signal output by the shift registers can be controlled by controlling the signals of corresponding nodes in each stage of the shift registers.

However, at present, the current leakage may occur at some nodes in the shift register, which affects the accuracy of the gate drive signal output by the shift register and then affects the display quality of the display panel.

SUMMARY

The present application provides a display panel and a display apparatus to improve the output stability of a shift register.

In an aspect, the present application provides a display panel comprising a first driving circuit, the first driving circuit comprising a plurality of stages of shift registers, each of the shift registers comprising:

- a first shift control module electrically connected to an input terminal, a first clock terminal, a first power supply terminal, a first node, a second node, and a third node, and configured to control a signal of the first node, a signal of the second node, and a signal of the third node;
- a second shift control module electrically connected to the input terminal, the first clock terminal, the first node, a second power supply terminal, and a fourth node, and configured to control a signal of the fourth node;
- a shift output module electrically connected to the fourth node, the second node, the first power supply terminal, the second power supply terminal, and a shift output terminal, and configured to control the shift output terminal to output a shift signal; and
- a potential control module electrically connected to the third node, a second clock terminal, and the second node, and configured to control the signal of the second node.

In another aspect, the present application provides a display apparatus comprising the display panel described above. The display panel comprises a first driving circuit, the first driving circuit comprising a plurality of stages of shift registers, each of the shift registers comprising: a first shift control module electrically connected to an input terminal, a first clock terminal, a first power supply terminal, a first node, a second node, and a third node, the first shift control module being configured to control a signal of the first node, a signal of the second node, and a signal of the third node; a second shift control module electrically connected to the input terminal, the first clock terminal, the first node, a second power supply terminal, and a fourth node, the second shift control module being configured to control a signal of the fourth node; a shift output module electrically connected to the fourth node, the second node, the first power supply terminal, the second power supply terminal, and a shift output terminal, the shift output module being configured to control the shift output terminal to output a shift signal; and a potential control module electrically connected to the third node, a second clock terminal, and the second node, the potential control module being configured to control the signal of the second node.

DETAILED DESCRIPTION

In order to enable those skilled in the art to better understand the solutions of the present application, the technical solutions in the embodiments of the present application will be clearly and completely described below with reference to the accompanying drawings in the embodiments of the present application, and it is obvious that the described embodiments are only some embodiments of the present application, but not all embodiments. Based on the embodiments in the present application, all other embodiments obtained by those skilled in the art without inventive effort should belong to the scope of protection of the present application.

It should be noted that the terms “first”, “second” and the like in the description, claims and the above description of the accompanying drawings of the present application are used for distinguishing similar objects, and not necessarily for describing a specific order or priority in order. It should be understood that the data used in this manner is interchangeable under appropriate conditions, so that the implementations or embodiments of the present application described herein can be implemented in other orders than illustrated or described herein. Moreover, the terms “comprising” and “including”, as well as any variation thereof, are intended to cover a non-exclusive inclusion (such as a series of steps or units including a process, a method, a system, a product, or a device), and are not limited to the steps or units that are listed expressly, but may include other steps or units that are not listed expressly.

Figure 1:
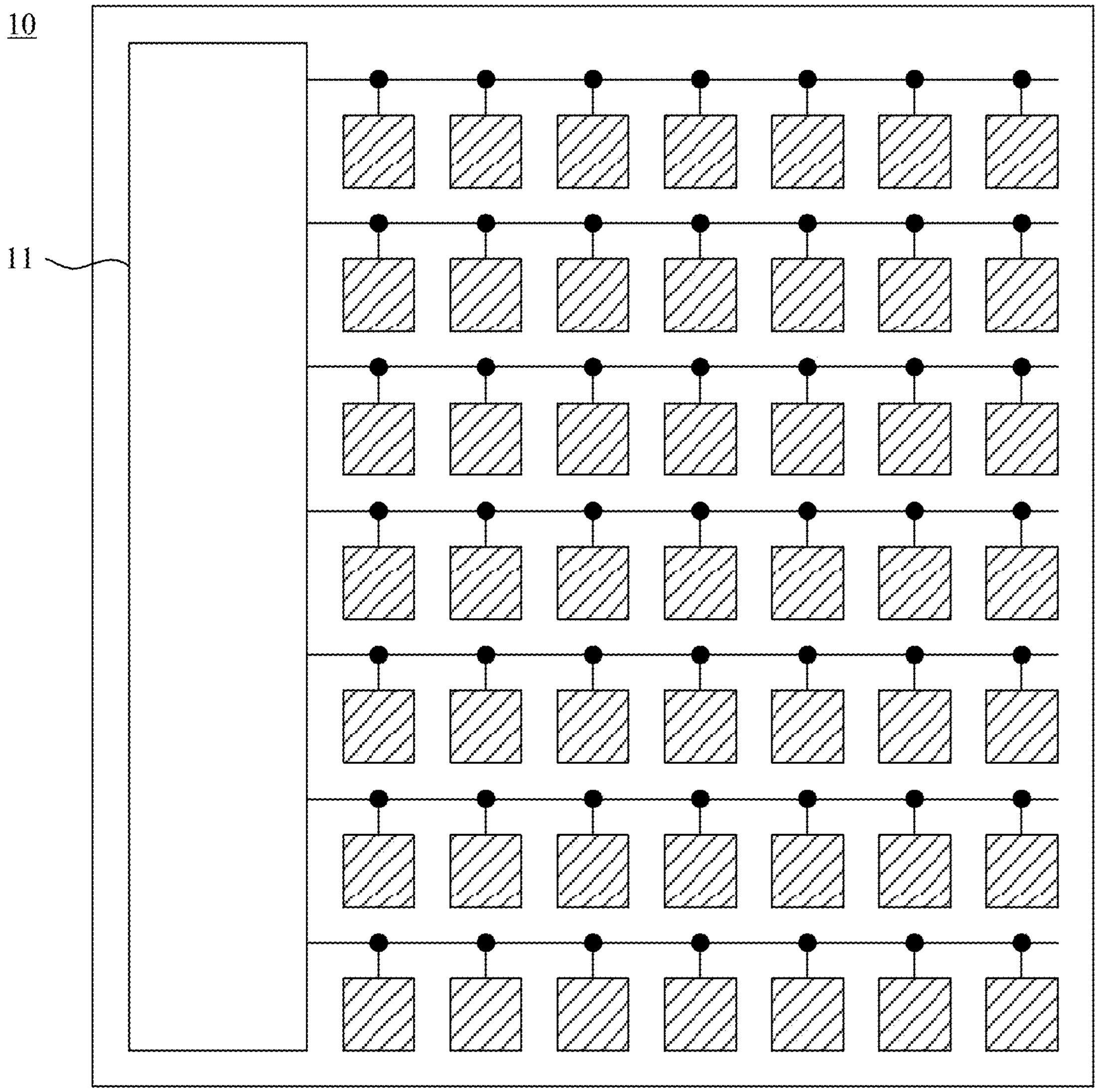
FIG. 1 shows a schematic view of a display panel provided in embodiments of the present application.
Figure 2:
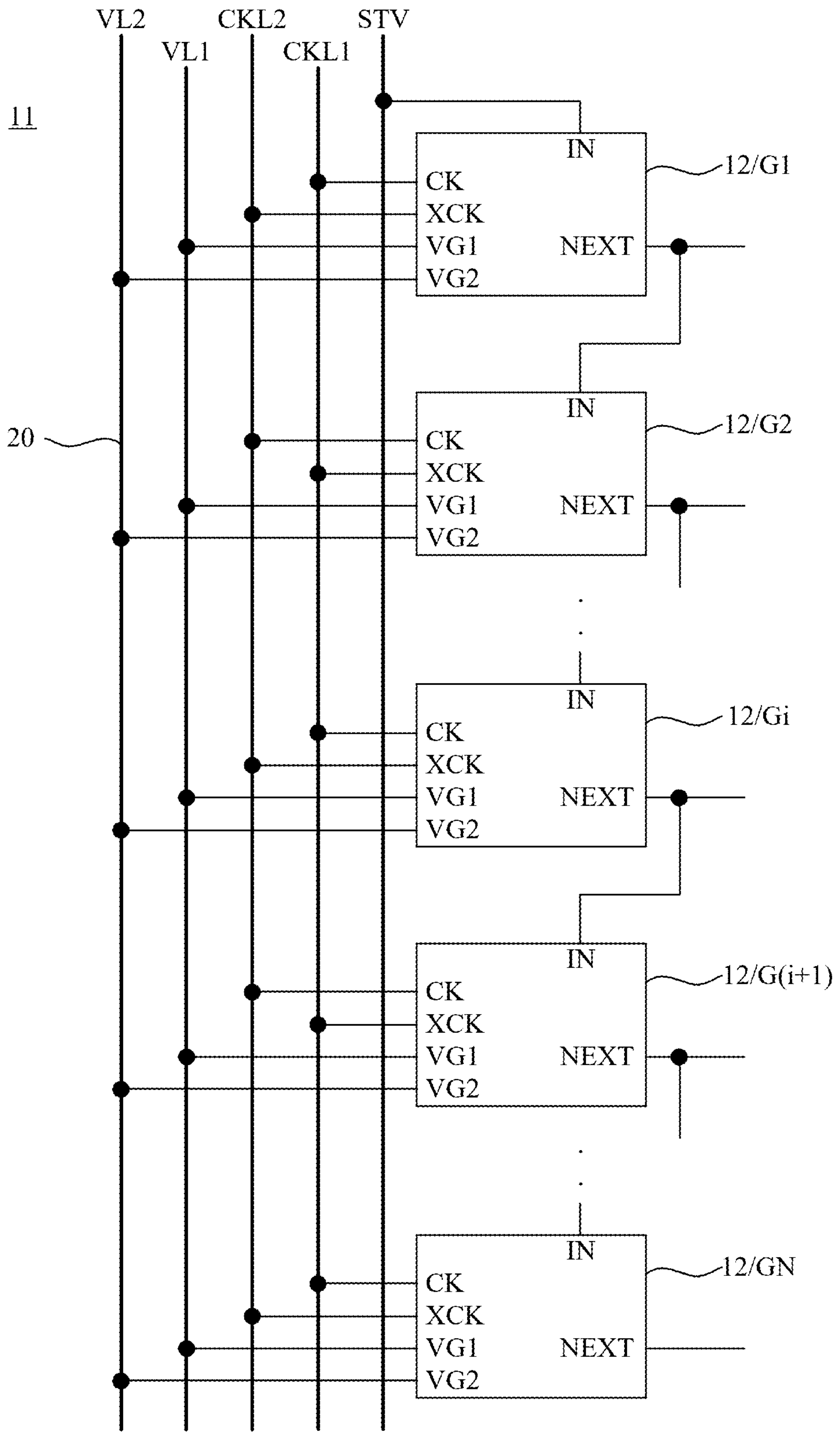
FIG. 2 shows a schematic view of a first driving circuit provided in embodiments of the present application.
Figure 3:
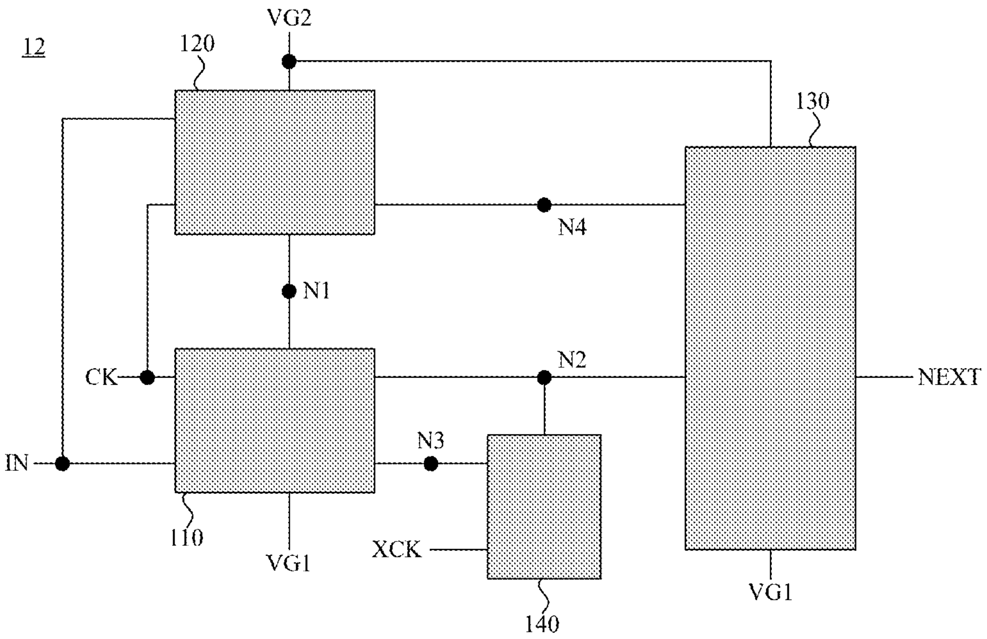
FIG. 3 shows a schematic view of a shift register provided in embodiments of the present application.
Figure 4:
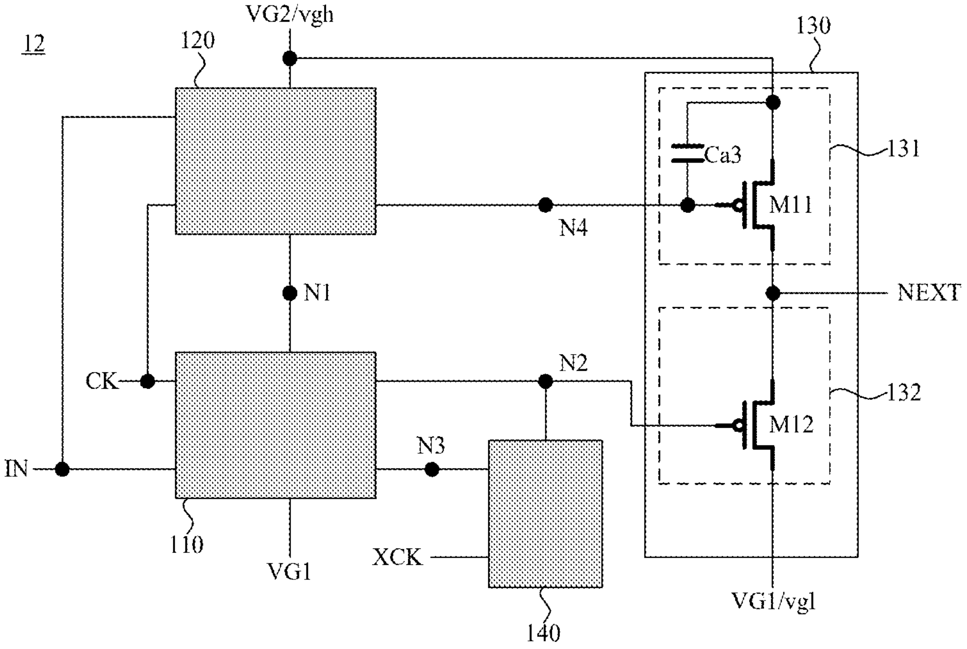
FIG. 4 shows a schematic view of another shift register provided in embodiments of the present application.
Figure 5:
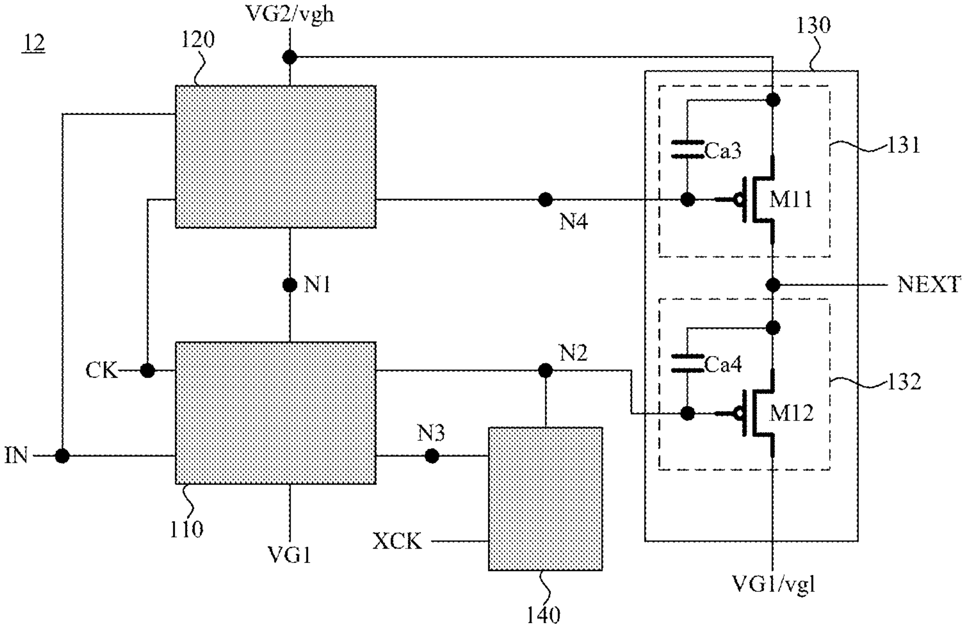
FIG. 5 shows a schematic view of yet another shift register provided in embodiments of the present application.

FIG. 1 shows a schematic view of a display panel provided in embodiments of the present application; FIG. 2 shows a schematic view of a first driving circuit provided in embodiments of the present application; FIG. 3 shows a schematic view of a shift register provided in embodiments of the present application; FIG. 4 shows a schematic view of another shift register provided in embodiments of the present application; and FIG. 5 shows a schematic view of yet another shift register provided in embodiments of the present application. Referring to FIGS. 1-5, the display panel 10 includes a first driving circuit 11 including a plurality of stages of shift registers 12. The shift register 12 includes: a first shift control module 110, a second shift control module 120, a shift output module 130, and a potential control module 140. The first shift control module 110 is electrically connected to an input terminal IN, a first clock terminal CK, a first power supply terminal VG1, a first node N1, a second node N2, and a third node N3, and the first shift control module 110 is configured to control the signal of the first node N1, the signal of the second node N2, and the signal of the third node N3. The second shift control module 120 is electrically connected to the input terminal IN, the first clock terminal CK, the first node N1, a second power supply terminal VG2, and a fourth node N4, and the second shift control module 120 is configured to control the signal of the fourth node N4. The shift output module 130 is electrically connected to the fourth node N4, the second node N2, the first power supply terminal VG1, the second power supply terminal VG2, and a shift output terminal NEXT, and the shift output module 130 is configured to control the shift output terminal NEXT to output a shift signal. The potential control module 140 is electrically connected to the third node N3, a second clock terminal XCK, and the second node N2, and the potential control module 140 is configured to control the signal of the second node N2.

In the present embodiment, the shift register 12 includes a first shift control module 110. The first shift control module 110 is electrically connected to the input terminal IN to receive an input signal provided by the input terminal IN; the first shift control module 110 is electrically connected to the first clock terminal CK to receive a first clock signal provided by the first clock terminal CK; the first shift control module 110 is electrically connected to the first power supply terminal VG1 to receive a first power supply signal provided by the first power supply terminal VG1. Further, the first shift control module 110 is electrically connected to the first node N1, the second node N2, and the third node N3. The first shift control module 110 controls the signal of the first node N1, the signal of the second node N2, and the signal of the third node N3 according to the input signal provided by the input terminal IN, the first clock signal provided by the first clock terminal CK, and the first power supply signal provided by the first power supply terminal VG1, so that the signals of the first node N1, the second node N2, and the third node N3 toggle between the high level and the low level.

The shift register 12 includes a second shift control module 120. The second power supply terminal VG2 provides a second power supply signal, which is different from the first power supply signal provided by the first power supply terminal VG1. One of the second power supply signal and the first power supply signal is at a low level, and the other is at a high level. The second shift control module 120 controls the signal of the fourth node N4 according to the input signal provided by the input terminal IN, the first clock signal, the signal of the first node N1, and the second power supply signal, so that the signal of the fourth node N4 toggles between the high level and the low level.

The shift register 12 includes a potential control module 140. The second clock terminal XCK provides a second clock signal, which is different from the first clock signal provided by the first clock terminal CK. The second clock signal provided by the second clock terminal XCK periodically toggles between the high level and the low level, and the first clock signal provided by the first clock terminal CK periodically toggles between the high level and the low level. Optionally, the frequency of the second clock signal is the same as that of the first clock signal, but the phases of the first clock signal and the second clock signal are different. The potential control module 140 controls the signal of the second node N2 according to the signal of the third node N3 and the second clock signal provided by the second clock terminal XCK, so that the signal of the second node N2 toggles between the high level and the low level.

The shift register 12 includes a shift output module 130. The shift output module 130 controls the shift output terminal NEXT to output a shift signal according to the signal of the fourth node N4, the signal of the second node N2, the first power supply signal of the first power supply terminal VG1, and the second power supply signal of the second power supply terminal VG2, where the shift signal includes an active level and an inactive level; one of the active level and the inactive level of the shift signal is a high level, and the other is a low level.

Optionally, as shown in FIGS. 1 and 2, the display panel 10 may further include a plurality of signal lines 20 for providing signals to the first driving circuit 11. Exemplarily, the plurality of signal lines 20 in the display panel 10 include at least an input signal line STV, a first clock signal line CKL1, a second clock signal line CKL2, a first power supply signal line VL1, and a second power supply signal line VL2. The input signal line STV provides an input signal to the input terminal IN of at least one stage of the shift registers 12; the first clock signal line CKL1 and the second clock signal line CKL2 provide a first clock signal to the first clock terminal CK of the shift register 12 and a second clock signal to the second clock terminal XCK of the shift register 12 respectively; the first power supply signal line VL1 provides a first power supply signal to the first power supply terminal VG1 of the shift register 12; and the second power supply signal line VL2 provides a second power supply signal to the second power supply terminal VG2 of the shift register 12. The display panel 10 may further include a plurality of other types of signal lines 20, which will not be repeated here.

Optionally, referring to FIG. 2, the shift output terminal NEXT of the $i^{th}$ stage shift register 12/Gi is electrically connected to the input terminal IN of the $(i+m)^{th}$ stage shift register 12, where m=1, and the shift output terminal NEXT of the $i^{th}$ stage shift register 12/Gi is electrically connected to the input terminal IN of the $(i+1)^{th}$ stage shift register 12/G(i+1). Optionally, in other embodiments, the shift output terminal of the $i^{th}$ stage shift register may further be electrically connected to the input terminal IN of the (i+m)th stage shift register, where m may be an integer greater than 1, such as m=2, m=3, m=4, or any other positive integers, which is not limited to m=1 as shown in FIG. 2.

Optionally, referring to FIGS. 4 and 5, the shift output module 130 includes a first output sub-module 131 and a second output sub-module 132. The first output sub-module 131 is electrically connected to the fourth node N4, the second power supply terminal VG2, and the shift output terminal NEXT and configured to control the shift output terminal NEXT to output a shift signal. The second output sub-module 132 is electrically connected to the second node N2, the first power supply terminal VG1, and the shift output terminal NEXT and configured to control the shift output terminal NEXT to output a shift signal. Optionally, the first output sub-module 131 includes an eleventh transistor M11 and a third capacitor Ca3. The gate of the eleventh transistor M11 is electrically connected to the fourth node N4, the first terminal of the eleventh transistor M11 is electrically connected to the second power supply terminal VG2, and the second terminal of the eleventh transistor M11 is electrically connected to the shift output terminal NEXT. The first plate of the third capacitor Ca3 is electrically connected to the fourth node N4, and the second plate of the third capacitor Ca3 is electrically connected to the second power supply terminal VG2. Optionally, the second output sub-module 132 includes a twelfth transistor M12, the gate of the twelfth transistor M12 is electrically connected to the second node N2, the first terminal of the twelfth transistor M12 is electrically connected to the first power supply terminal VG1, and the second terminal of the twelfth transistor M12 is electrically connected to the shift output terminal NEXT. Optionally, referring to FIG. 5, the second output sub-module 132 includes a fourth capacitor Ca4, the first plate of the fourth capacitor Ca4 is electrically connected to the second node N2, and the second plate of the fourth capacitor Ca4 is electrically connected to the shift output terminal NEXT.

In this embodiment, the shift output module 130 includes a first output sub-module 131. Optionally, the first output sub-module 131 includes an eleventh transistor M11 and a third capacitor Ca3, and the gate of the eleventh transistor M11 is electrically connected to the fourth node N4. When the signal of the fourth node N4 controls the eleventh transistor M11 to be turned on, the second power supply signal provided by the second power supply terminal VG2 is written to the shift output terminal NEXT through the turned-on eleventh transistor M11. The shift output module 130 includes a second output sub-module 132. Optionally, the second output sub-module 132 includes a twelfth transistor M12, and the gate of the twelfth transistor M12 is electrically connected to the second node N2. When the signal of the second node N2 controls the twelfth transistor M12 to be turned on, the first power supply signal provided by the first power supply terminal VG1 is written to the shift output terminal NEXT through the turned-on twelfth transistor M12.

The first output sub-module 131 and the second output sub-module 132 of the shift output module 130 are turned on in a time-sharing manner.

Optionally, the eleventh transistor M11 and the twelfth transistor M12 each are PMOS, the second power supply signal is at a high level vgh, and the first power supply signal is at a low level vgl. Based on this, the signal of the second node N2 is at the high level, and after the signal of the fourth node N4 toggles from the high level to the low level, the eleventh transistor M11 is turned on and the twelfth transistor M12 is turned off, and the high level vgh provided by the second power supply terminal VG2 is transmitted and written to the shift output terminal NEXT through the turned-on eleventh transistor M11. Alternatively, the signal of the fourth node N4 is at the high level, and after the signal of the second node N2 toggles from the high level to the low level, the eleventh transistor M11 is turned off and the twelfth transistor M12 is turned on, and the low level vgl provided by the first power supply terminal VG1 is transmitted and written to the shift output terminal NEXT through the turned-on twelfth transistor M12.

Optionally, in other embodiments, at least one of the eleventh transistor M11 and the twelfth transistor M12 is an NMOS, and the high and low levels of the power supply signals provided by the first power supply terminal and the second power supply terminal in the corresponding shift output module may be adaptively adjusted and are not limited to that shown in FIG. 4 or 5.

Figure 6:
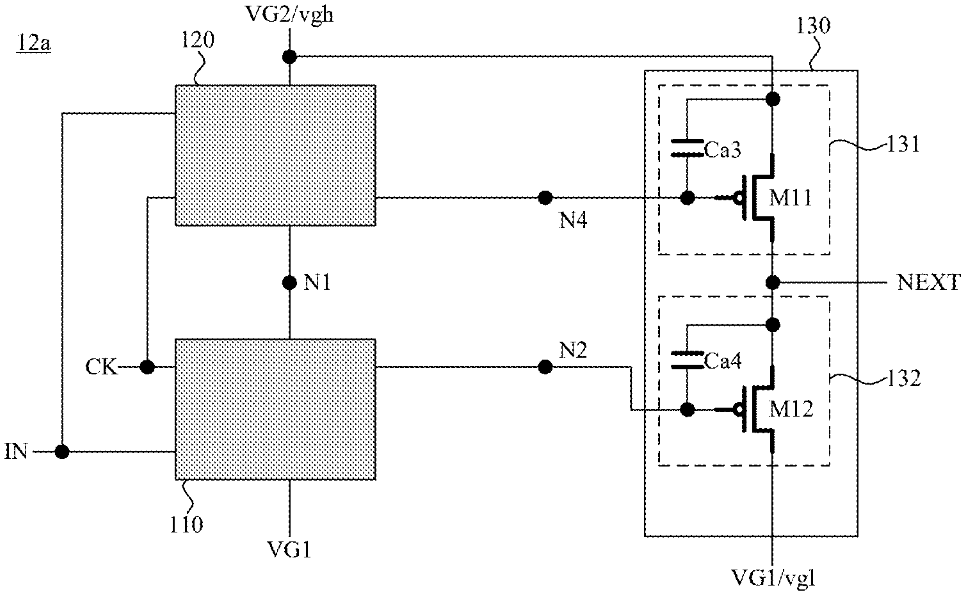
FIG. 6 shows a schematic view of a shift register provided in a comparative example.

FIG. 6 shows a schematic view of a shift register provided in a comparative example. Compared with FIG. 5, a shift register 12*a* is not provided with the potential control module 140. Correspondingly, the shift register 12*a* is not provided with the third node N3. Optionally, in FIG. 6, the active level output by the shift output terminal NEXT is the high level vgh, and the inactive level is a low level. When the level output by the shift register 12*a* is the inactive level vgl, the low level of the shift output terminal NEXT is coupled through the fourth capacitor Ca4, so that the potential of the second node N2 is sufficiently low to ensure that the shift register 12*a* can normally output the low level vgl.

In FIG. 6, when the shift register 12*a* operates in the low-frequency mode, specifically in the data holding stage, the second node N2 of the shift register 12*a* is at the low level to ensure that the shift output terminal NEXT remains at the low level vgl for a long time, but in practice, the low level of the second node N2 may gradually increase due to current leakage, which may cause the low level of the shift output terminal NEXT to rise, resulting in the abnormal output of the shift register 12*a*. Even though the capacitance of the fourth capacitor Ca4 is increased to enhance the voltage holding capability of the second node N2, during the long data holding stage, the leakage current of the second node N2 increases, such that the low level of the second node N2 still rises, thereby causing the abnormal output of the shift register 12*a*.

In this embodiment, a potential control module 140 is disposed between the third node N3 and the second node N2. The potential control module 140 controls the signal of the second node N2 according to the signal of the third node N3 and the second clock signal provided by the second clock terminal XCK. It is possible to avoid the problem that the second node N2 leaks current and causes an abnormal output.

Referring to FIG. 4, when the shift register 12 operates in the data holding stage, the second node N2 is at the low level, the signal output by the shift output terminal NEXT of the shift register 12 is the first power supply signal vgl.

After the second clock signal provided by the second clock terminal XCK toggles from the low level to the high level, the potential control module 140 is controlled to be turned off to isolate the second node N2 from the second clock terminal XCK, and the high level of the second clock signal does not affect the signal of the second node N2, so that the second node N2 remains at the low level.

After the second clock signal provided by the second clock terminal XCK toggles from the high level to the low level, the potential control module 140 is turned on to connect the second node N2 and the second clock terminal XCK, and the low level of the second clock signal pulls down the signal of the second node N2 through coupling, so that the second node N2 is kept at the low level.

Therefore, in this embodiment, the potential control module 140 is provided to allow the periodic toggling of the second clock signal between the high level and the low level to periodically couple to the second node N2, and the second node N2 can remain at the low level in the data holding stage to avoid the low level of the second node N2 from gradually increasing due to current leakage, so that the normal output of the shift output terminal NEXT can be ensured. Especially, when the shift register 12 operates in the low-frequency mode, the potential control module 140 can ensure the normal output of the shift output terminal NEXT.

Furthermore, in FIG. 5, a fourth capacitor Ca4 is added to further enhance the voltage holding capability of the second node N2. In embodiments of the present application, it can be understood that the fourth capacitor Ca4 may or may not be provided in the shift register 12.

Similarly, in other embodiments, when it is assumed that the twelfth transistor is an NMOS, the periodic toggling of the second clock signal between the high level and the low level can periodically couple to the second node N2 by the potential control module 140, and the second node N2 can remain at the high level in the data holding stage to avoid the high level of the second node N2 from gradually decreasing due to current leakage, so that the normal output of the shift output terminal NEXT can be ensured.

In the present application, the potential control module is added in the shift register, and receives the second clock signal provided by the second clock terminal. The second clock signal periodically toggles between the high level and the low level. The potential control module controls the signal of the second node according to the second clock signal provided by the second clock terminal and the signal of the third node, and the potential control module can enhance the voltage holding capability of the second node. In particular, when the shift register operates in a low-frequency mode, the second node can operate at the low level or the high level for a long time, and the second clock signal periodically toggling between the high level and the low level can periodically couple to the second node, thereby enhancing the voltage holding capability of the second node, maintaining the second node at the corresponding required level for a long time, reducing the leakage current of the second node, which is beneficial to ensuring the output effectiveness, accuracy, and stability of the shift register, and improving the display quality of the display panel.

The above is the core idea of the present application, and based on the embodiments of the present application, all other embodiments obtained by those ordinary skilled in the art without any creative work shall fall within the protection scope of the present application. The technical solutions in the embodiments of the present application will be described clearly and completely below with reference to the drawings of the embodiments of the present application.

Referring to FIGS. 3 and 5, in the display panel 10, the shift register 12 includes a first shift control module 110, a second shift control module 120, and a shift output module 130 that together constitute the shift output section of the shift register 12. The shift output section of the shift register 12 includes an input terminal IN and a shift output terminal NEXT, and is configured to control the shift output terminal NEXT to output a shift signal. The shift signal includes an active level and an inactive level. In the display panel 10, the configuration of the first shift control module 110, the second shift control module 120, and the shift output module 130 in the shift register 12 has diversity. For example, the configurations of the first shift control module 110, the second shift control module 120, and the shift output module 130 may be "p*T+k*C", where "T" represents a transistor, "C" represents a storage capacitor, and p and k are constants. Exemplarily, when p is 9 and k is 2, the configuration of the first shift control module 110, the second shift control module 120, and the shift output module 130 includes 9 transistors and 2 capacitors, but p and k are not limited thereto. For example, p is 7 and k is 2, etc. In the following embodiments, the configuration formed by the first shift control module 110, the second shift control module 120, and the shift output module 130 is not specifically limited, and relevant practitioners can adaptively adjust the shift output section as needed, which is not limited to the following drawings.

Figure 7:
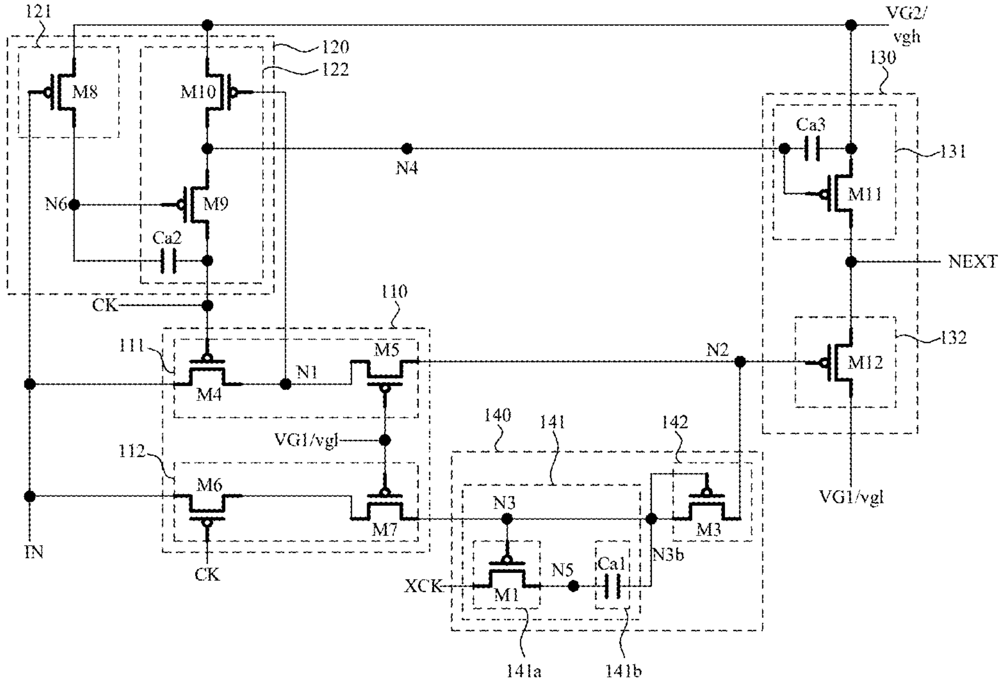
FIG. 7 shows a schematic view of yet another shift register provided in embodiments of the present application.

FIG. 7 shows a schematic view of yet another shift register provided in embodiments of the present application. Optionally, the first shift control module 110 includes a first shift sub-module 111 and a second shift control sub-module 112; the first shift control sub-module 111 is electrically connected to an input terminal IN, a first clock terminal CK, a first power supply terminal VG1, a first node N1, and a second node N2, and is configured to control the signal of the first node N1 and the signal of the second node N2; and the second shift control sub-module 112 is electrically connected to the input terminal IN, the first clock terminal CK, the first power supply terminal VG1, and a third node N3, and is configured to control the signal of the third node N3. Optionally, the first shift control sub-module 111 includes a fourth transistor M4 and a fifth transistor M5; the gate of the fourth transistor M4 is electrically connected to the first clock terminal CK, the first terminal of the fourth transistor M4 is electrically connected to the input terminal IN, and the second terminal of the fourth transistor M4 is electrically connected to the first node N1; and the gate of the fifth transistor M5 is electrically connected to the first power supply terminal VG1, the first terminal of the fifth transistor M5 is electrically connected to the first node N1, and the second terminal of the fifth transistor M5 is electrically connected to the second node N2. The second shift control sub-module 112 includes a sixth transistor M6 and a seventh transistor M7; the gate of the sixth transistor M6 is electrically connected to the first clock terminal CK, the first terminal of the sixth transistor M6 is electrically connected to the input terminal IN, and the second terminal of the sixth transistor M6 is electrically connected to the first terminal of the seventh transistor M7; and the gate of the seventh transistor M7 is electrically connected to the first power supply terminal VG1, and the second terminal of the seventh transistor M7 is electrically connected to the third node N3.

In this embodiment, the first clock signal provided by the first clock terminal CK controls the fourth transistor M4 and the sixth transistor M6 to be on or off simultaneously. When the first clock signal provided by the first clock terminal CK controls the fourth transistor M4 and the sixth transistor M6 to be on simultaneously, the input signal provided by the input terminal IN is written to the first node N1 through the turned-on fourth transistor M4, and the input signal provided by the input terminal IN is transmitted to the seventh transistor M7 through the turned-on sixth transistor M6.

When the first power supply signal provided by the first power supply terminal VG1 controls the fifth transistor M5 and the seventh transistor M7 to be on, the signal of the first node N1 is written to the second node N2 through the turned-on fifth transistor M5, and the signal of the output terminal of the sixth transistor M6 is transmitted to the third node N3 through the seventh transistor M7.

Optionally, the second shift control module 120 includes a third shift control sub-module 121 and a fourth shift control sub-module 122. The third shift control sub-module 121 is electrically connected to the input terminal IN, the second power supply terminal VG2, and the sixth node N6, and is configured to control the signal of the sixth node N6. The fourth shift control sub-module 122 is electrically connected to the sixth node N6, the first clock terminal CK, the second power supply terminal VG2, the first node N1, and a fourth node N4, and is configured to control the signal of the fourth node N4. Optionally, the third shift control sub-module 121 includes an eighth transistor M8. The gate of the eighth transistor M8 is electrically connected to the input terminal IN, the first terminal of the eighth transistor M8 is electrically connected to the second power supply terminal VG2, and the second terminal of the eighth transistor M8 is electrically connected to the sixth node N6. Optionally, the fourth shift control sub-module 122 includes a ninth transistor M9 and a tenth transistor M10, the gate of the ninth transistor M9 is electrically connected to the sixth node N6, the first terminal of the ninth transistor M9 is electrically connected to the first clock terminal CK, and the second terminal of the ninth transistor M9 is electrically connected to the fourth node N4. The gate of the tenth transistor M10 is electrically connected to the first node N1, the first terminal of the tenth transistor M10 is electrically connected to the second power supply terminal VG2, and the second terminal of the tenth transistor M10 is electrically connected to the fourth node N4. The fourth shift control sub-module 122 includes a second capacitor Ca2, the first plate of the second capacitor Ca2 is electrically connected to the sixth node N6, and the second plate of the second capacitor Ca2 is electrically connected to the first clock terminal CK.

In this embodiment, the input signal provided by the input terminal IN controls the eighth transistor M8 to be turned on or off. When the input signal provided by the input terminal IN controls the eighth transistor M8 to be turned on, the second power supply signal provided by the second power supply terminal VG2 is transmitted to the sixth node N6 through the turned-on eighth transistor M8.

The signal of the sixth node N6 controls the ninth transistor M9 to be turned on or off. When the signal of the sixth node N6 controls the ninth transistor M9 to be turned on, the first clock signal provided by the first clock terminal CK is written to the fourth node N4. The signal of the first node N1 controls the tenth transistor M10 to be turned on or off. Under a condition that the signal of the first node N1 controls the tenth transistor M10 to be turned on, the second power supply signal provided by the second power supply terminal VG2 is transmitted to the fourth node N4 through the turned-on tenth transistor M10.

Optionally, the potential control module 140 includes a first potential control sub-module 141 and a second potential control sub-module 142. The first potential control sub-module 141 is electrically connected to the second clock terminal XCK and the third node N3, and is configured to control the signal of the third node N3. The second potential control sub-module 142 is electrically connected to the third node N3 and the second node N2, and is configured to control the signal of the second node N2.

Optionally, the first potential control sub-module 141 includes a first potential control unit **141*a* and a first coupling unit 141*b*. The first potential control unit 141*a* is electrically connected to the second clock terminal XCK, the third node N3, and the fifth node N5, and is configured to control the signal of the fifth node N5. The first terminal of the first coupling unit 141*b* is electrically connected to the fifth node N5, and the second terminal of the first coupling unit 141*b* is electrically connected to the third node N3. Optionally, the first potential control unit 141*a* includes a first transistor M1; the gate of the first transistor M1 is electrically connected to the third node N3, the first terminal of the first transistor M1 is electrically connected to the second clock terminal XCK, and the second terminal of the first transistor M1 is electrically connected to the fifth node N5. The first coupling unit 141*b*** includes a first capacitor Ca1; the first plate of the first capacitor Ca1 is electrically connected to the fifth node N5, and the second plate of the first capacitor Ca1 is electrically connected to the third node N3.

Optionally, the second potential control sub-module 142 includes a third transistor M3; the first terminal and the gate of the third transistor M3 are electrically connected to the third node N3, and the second terminal of the third transistor M3 is electrically connected to the second node N2.

In this embodiment, the signal of the third node N3 controls the first transistor M1 to be turned on or off. Under a condition that the signal of the third node N3 controls the first transistor M1 to be on, the second clock signal provided by the second clock terminal XCK is transmitted to the fifth node N5 through the turned-on first transistor M1, and thus the signal of the third node N3 can be coupled through the first capacitor Ca1.

The signal of the third node N3 further controls the third transistor M3 to be turned on or off. Under a condition that the signal of the third node N3 controls the third transistor M3 to be on, the signal of the third node N3 is written to the second node N2 through the turned-on third transistor M3.

Optionally, the first transistor M1 and the third transistor M3 each are a PMOS. Optionally, the fourth transistor M4, the fifth transistor M5, the sixth transistor M6, and the seventh transistor M7 each are a PMOS. Optionally, the eighth transistor M8, the ninth transistor M9, and the tenth transistor M10 each are a PMOS. Optionally, the eleventh transistor M11 and the twelfth transistor M12 each are a PMOS. Optionally, the first power supply signal provided by the first power supply terminal VG1 may be at the low level vgl, and the second power supply signal provided by the second power supply terminal VG2 may be at the high level vgh. However, it is not limited to this, and relevant practitioners can reasonably design the transistors in circuits and the signals of signal terminals according to the requirements of products.

Optionally, in this embodiment, the phase of the first clock signal provided by the first clock terminal VG1 is different from the phase of the second clock signal provided by the second clock terminal XCK. Optionally, the period of the first clock signal is the same as the period of the second clock signal. Optionally, the phase difference between the first clock signal and the second clock signal is 2/H, where H is the period of the first clock signal.

Optionally, the operation process of the shift register includes a first stage and a second stage. In the first stage, the transmission path between the first power supply terminal and the shift output terminal in the shift output module is controlled to be conductive, so that the first power supply signal provided by the first power supply terminal is transmitted to the shift output terminal. In the second stage, the transmission path between the second power supply terminal and the shift output terminal in the shift output module is controlled to be conductive, so that the second power supply signal provided by the second power supply terminal is transmitted to the shift output terminal.

Optionally, the second clock signal provided by the second clock terminal toggles between a first level signal and a second level signal. In the first stage, when the second clock signal toggles to the first level signal, the potential control module is controlled to be on, and when the second clock signal toggles to the second level signal, the potential control module is controlled to be turned off. The first level signal has the same polarity as the signal of the second node, and the second level signal has the opposite polarity to the signal of the second node. In the second stage, the potential control module is turned off.

Optionally, in this embodiment, under a condition that the first power supply signal vgl provided by the first power supply terminal VG1 is transmitted to the shift output terminal NEXT, the shift output terminal NEXT outputs the shift signal at an inactive level. On the contrary, under a condition that the second power supply signal vgh provided by the second power supply terminal VG2 is transmitted to the shift output terminal NEXT, the shift output terminal NEXT outputs the shift signal at an active level. Therefore, the first stage of the shift register 12 can also be understood as a stage for outputting the shift signal at the inactive level, and the second stage of the shift register 12 can also be understood as a stage for outputting the shift signal at the active level.

Taking for example that the twelfth transistor M12 is a PMOS, in the first stage, the second node N2 is at the low level. Under a condition that the second clock signal toggles to the low level having the same polarity as the signal of the second node N2, the potential control module 140 is turned on. Under a condition that the second clock signal toggles to the high level having the opposite polarity to the signal of the second node N2, the potential control module 140 is turned off. In the second stage, the second node N2 is at the high level, and the potential control module 140 is turned off.

In other embodiments, when the twelfth transistor M12 is an NMOS, in the first stage, the second node N2 is at the high level; under a condition that the second clock signal toggles to the high level having the same polarity as the signal of the second node, the potential control module is turned on. Under a condition that the second clock signal toggles to the low level having the opposite polarity to the signal of the second node, the potential control module is turned off. In the second stage, the second node N2 is at the low level, and the potential control module is turned off.

Figure 8:
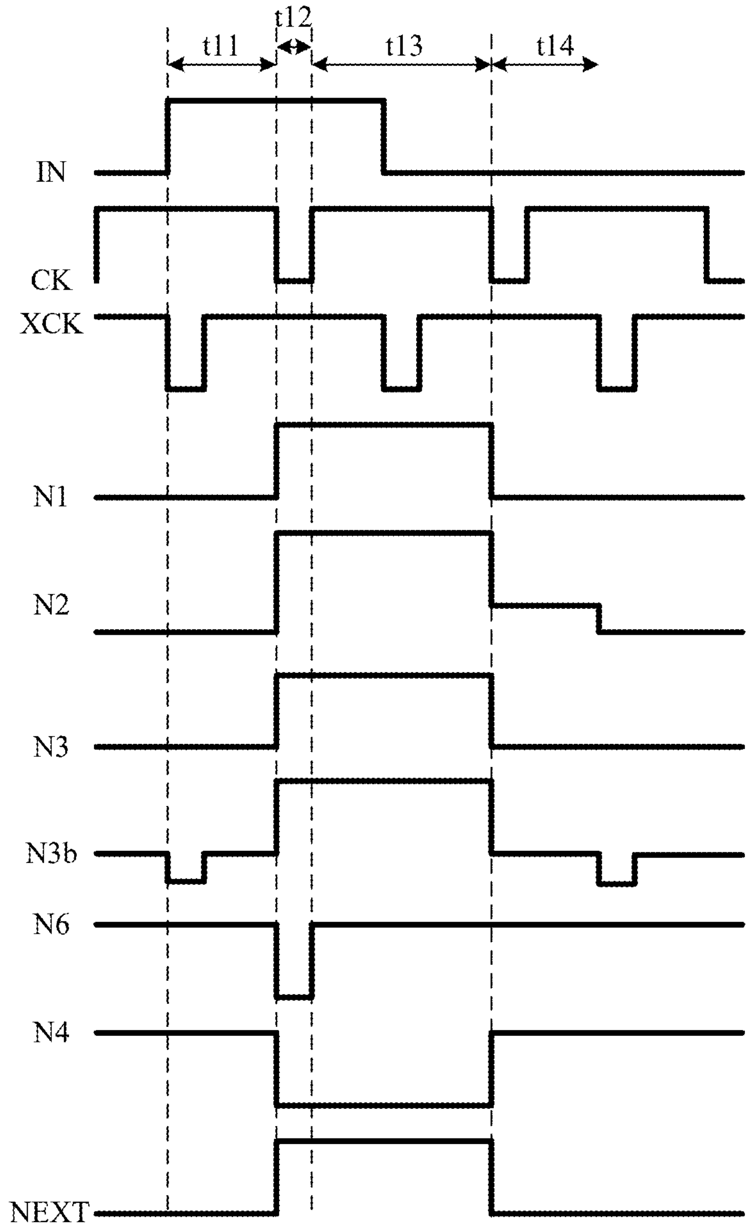
FIG. 8 shows an operation timing diagram of the shift register shown in FIG. 7.

FIG. 8 shows an operation timing diagram of the shift register shown in FIG. 7. Referring to FIGS. 7 and 8, the operation process of the shift register 12 at least includes the following stages t11-t14.

In the stage t11, the first clock signal provided by the first clock terminal CK is at the high level, the sixth transistor M6 and the fourth transistor M4 each are turned off, the fifth transistor M5 and the seventh transistor M7 remain turned on, and the first node N1, the second node N2, and the third node N3 remain at the low level in the previous stage. The eighth transistor M8 is turned off, the sixth node N6 remains at the high level in the previous stage, and the ninth transistor M9 is turned off; the tenth transistor M10 is turned on, the fourth node N4 is at the high level, and the eleventh transistor M11 is turned off; the twelfth transistor M12 is turned on, and the first power supply signal vgl provided by the first power supply terminal VG1 is transmitted to the shift output terminal NEXT. In this stage, when the first transistor M1 is turned on, and when the second clock signal provided by the second clock terminal XCK toggles from the high level to the low level and is coupled to the first capacitor Ca1, the low level of the node N3*b* can be pulled down to a lower level, the low level of the node N3*b* controls the third transistor M3 to be turned on, and the low level of the node N3*b* is written to the second node N2 to ensure that the twelfth transistor M12 is turned on. That is, when the second clock signal toggles to the low level having the same signal polarity as the second node N2, the potential control module 140 is turned on. Sequentially, when the second clock signal provided by the second clock terminal XCK toggles from the low level to the high level and is coupled to the first capacitor Ca1, the level of the node N3*b* (the same as the third node N3) can be pulled up, the level of the node N3*b* is higher than that of the second node N2, the third transistor M3 is controlled to be turned off, the level of the node N3*b* does not affect the second node N2, and the second node N2 remains at the low level and controls the twelfth transistor M12 to be turned on. That is, when the second clock signal toggles to the high level having the opposite signal polarity to the second node N2, the potential control module 140 is turned off.

In the stage t12, when the first clock signal provided by the first clock terminal CK is at the low level, the sixth transistor M6 and the fourth transistor M4 are simultaneously turned on, the fifth transistor M5 and the seventh transistor M7 remain turned on, and the high-level signal provided by the input terminal IN is written to the first node N1, the second node N2, and the third node N3; the first transistor M1, the third transistor M3, the eighth transistor M8, the tenth transistor M10, and the twelfth transistor M12 are turned off; the first clock terminal CK is coupled to the second capacitor Ca2 to pull down the potential of the sixth node N6, and the ninth transistor M9 is turned on; the low level of the first clock signal is written to the fourth node N4, and the eleventh transistor M11 is turned on; the second power supply signal vgh provided by the second power supply terminal VG2 is transmitted to the shift output terminal NEXT. That is, in the second stage, the potential control module 140 is turned off.

In the stage t13, when the first clock signal provided by the first clock terminal CK is at the high level, the sixth transistor M6 and the fourth transistor M4 are turned off simultaneously, the fifth transistor M5 and the seventh transistor M7 remain turned on, and the first node N1, the second node N2, and the third node N3 each remain at the high level; the first transistor M1, the third transistor M3, the eighth transistor M8, the tenth transistor M10, and the twelfth transistor M12 are turned off; the first clock terminal CK is coupled to the second capacitor Ca2 to pull up the potential of the sixth node N6, and the ninth transistor M9 is turned off; the fourth node N4 remains at the low level, and the eleventh transistor M11 is turned on; the second power supply signal vgh provided by the second power supply terminal VG2 is transmitted to the shift output terminal NEXT. That is, in the second stage, the potential control module 140 is turned off.

In the stage t14, when the first clock signal provided by the first clock terminal CK toggles between the high level and the low level, the fifth transistor M5 and the seventh transistor M7 remain turned on, and when the sixth transistor M6 and the fourth transistor M4 are turned on, the low-level signal provided by the input terminal IN is written to the first node N1, the second node N2, and the third node N3; the eighth transistor M8, the tenth transistor M10, and the twelfth transistor M12 each are turned on; the sixth node N6 and the fourth node N4 each are at the high level, and the ninth transistor M9 and the eleventh transistor M11 each are turned off; the first power supply signal vgl provided by the first power supply terminal VG1 is transmitted to the shift output terminal NEXT. In this stage, when the first transistor M1 is turned on, and the second clock signal provided by the second clock terminal XCK toggles from the high level to the low level and is coupled to the first capacitor Ca1, the low level of the node N3*b* (the same as the third node N3) can be pulled down to the lower level, the low level of the node N3*b* controls the third transistor M3 to be turned on, and the low level of the node N3*b* is written to the second node N2 to ensure that the twelfth transistor M12 is turned on. That is, the second clock terminal XCK toggles to the low level having the same polarity as the signal of the second node N2, enabling the potential control module 140 to be turned on. Sequentially, when the second clock signal provided by the second clock terminal XCK toggles from the low level to the high level and is coupled to the first capacitor Ca1 to pull up the level of the node N3*b*, the level of the node N3*b* is higher than that of the second node N2, the third transistor M3 is controlled to be turned off, the level of the node N3*b* does not affect the second node N2, the second node N2 remains at the low level and controls the twelfth transistor M12 to be turned on. That is, the second clock signal toggles to the high level opposite to the signal polarity of the second node N2, enabling the potential control module 140 to be turned off.

Optionally, in FIG. 7, a fourth capacitor (referring to the fourth capacitor Ca4 shown in FIG. 5) is added between the second node N2 and the shift output terminal NEXT to enhance the voltage holding capability of the second node N2.

As described above, the stages from t12 to t13 are the output stage of the active level of the shift signal from the shift register 12, i.e., the second stage, and the stages from t14 to t11 of the next frame are the output stage of the inactive level of the shift signal of the shift register 12, i.e., the first stage. It can be seen that, from the stage t14 of the current frame to the stage t11 (the first stage) of the next frame, the second node N2 remains at the low level. When the second clock signal toggles to the low level, the potential control module 140 is turned on; and when the second clock signal toggles to the high level, the potential control module 140 is turned off, so that the potential of the second node N2 can be pulled down, and the twelfth transistor M12 can be continuously controlled to be turned on, which is beneficial to transmitting the first power supply signal vgl provided by the first power supply terminal VG1 to the shift output terminal NEXT. In particular, when the shift register 12 operates in the low-frequency mode, the second clock signal periodically toggling between the high level and the low level can periodically couple to the second node N2, which can enhance the voltage holding capability of the second node N2, reduce the leakage current of the second node, ensure the output effectiveness, accuracy, and stability of the shift register, and further improve the display quality of the display panel.

Figure 9:
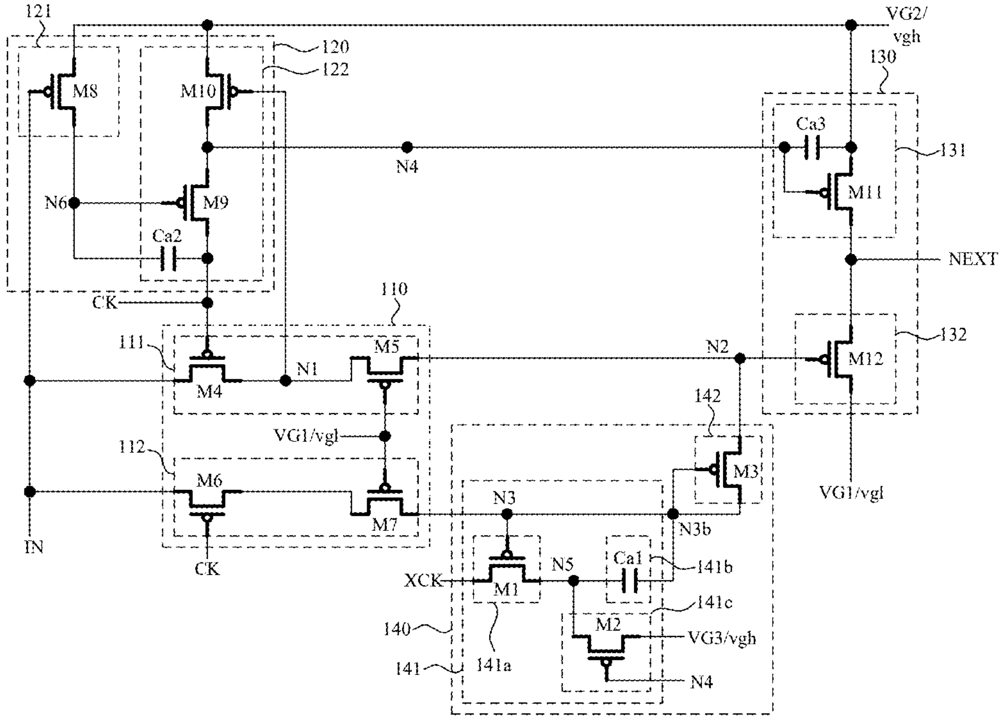
FIG. 9 shows a schematic view of yet another shift register provided in embodiments of the present application.

FIG. 9 shows a schematic view of yet another shift register provided in embodiments of the present application. Optionally, unlike the first potential control sub-module 141 in FIG. 7, the first potential control sub-module 141 in FIG. 9 comprises a second potential control unit 141*c* which is electrically connected to the fourth node N4, the third power supply terminal VG3, and the fifth node N5, and is configured to control the signal of the fifth node N5. Optionally, the second potential control unit 141*c* includes a second transistor M2. The gate of the second transistor M2 is electrically connected to the fourth node N4, the first terminal of the second transistor M2 is electrically connected to the third power supply terminal VG3, and the second terminal of the second transistor M2 is electrically connected to the fifth node N5. Optionally, the third power supply signal provided by the third power supply terminal VG3 may be a fixed voltage signal. Optionally, the second power supply signal provided by the second power supply terminal VG2 is the same as the third power supply signal.

In this embodiment, the first potential control sub-module 141 includes the first transistor M1, the second transistor M2, and the first capacitor Ca1. The gate of the second transistor M2 is electrically connected to the fourth node N4, the first terminal of the second transistor M2 is electrically connected to the third power supply terminal VG3, and the second terminal of the second transistor M2 is electrically connected to the fifth node N5. The signal of the fourth node N4 controls the second transistor M2 to be turned on or off. When the signal of the fourth node N4 controls the second transistor M2 to be turned on, the third power supply signal provided by the third power supply terminal VG3 is written to the fifth node N5.

Optionally, the third power supply signal provided by the third power supply terminal VG3 may be a fixed voltage signal. Optionally, the second power supply signal provided by the second power supply terminal VG2 is the same as the third power supply signal. In this embodiment, the second power supply signal is at the high level vgh, and optionally, the third power supply signal provided by the third power supply terminal VG3 may be at the high level vgh.

The operation process of the shift register 12 comprises a first stage and a second stage.

Figure 10:
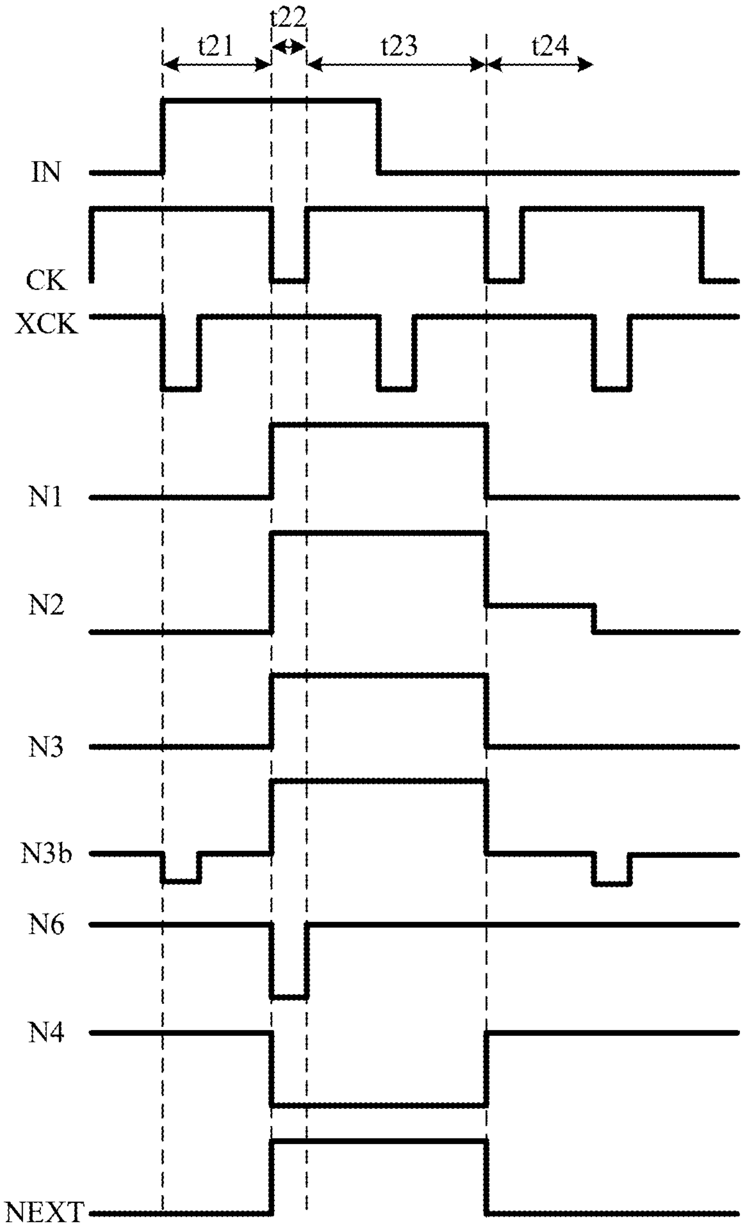
FIG. 10 shows an operation timing diagram of the shift register shown in FIG. 9.

FIG. 10 shows an operation timing diagram of the shift register shown in FIG. 9. Referring to FIGS. 9 and 10, the operation process of the shift register 12 at least includes the following stages t21-t23.

In the stage t21, the signals of multiple nodes and the on-off states of transistors are similar to those in the stage t11, and will not be repeated. Among them, the fourth node N4 is at the high level, and the second transistor M2 is controlled to be turned off.

In the stages t22 and t23, the signals of multiple nodes and the on-off states of transistors are similar to those in the stages t12 to t13, and will not be repeated. Among them, the fourth node N4 is at the low level and controls the second transistor M2 to be turned on, the third power supply signal vgh provided by the third power supply terminal VG3 is transmitted to the fifth node N5, and the third power supply signal vgh is coupled to and pulls up the potential of the node N3*b* through the first capacitor Ca1 to ensure that the node N3*b* is at the high level. That is, in the second stage, the potential control module 140 is turned off.

In the stage t24, the signals of multiple nodes and the on-off states of transistors are similar to those in the stage t14, and will not be repeated; and the fourth node N4 is at the high level, and the second transistor M2 is controlled to be turned off.

Optionally, in FIG. 9, a fourth capacitor (referring to the fourth capacitor Ca4 shown in FIG. 5) is added between the second node N2 and the shift output terminal NEXT to enhance the voltage holding capability of the second node N2.

As described above, in the stages T22 to T23, which are the output stage of the active level of the shift signal from the shift register 12, the second transistor M2 is turned on, and the third power supply signal vgh provided by the third power supply terminal VG3 can be coupled to and pull up the potential of the node N3*b* through the first capacitor Ca1, thereby ensuring that the third transistor M3 is turned off, preventing the toggling of the second clock signal from affecting the potential of the node N3*b*, further enhancing the voltage holding ability of the second node N2, reducing the leakage current of the second node N2, which is beneficial to ensuring the output effectiveness, accuracy, and stability of the shift register and thus improving the display quality of the display panel.

Figure 11:
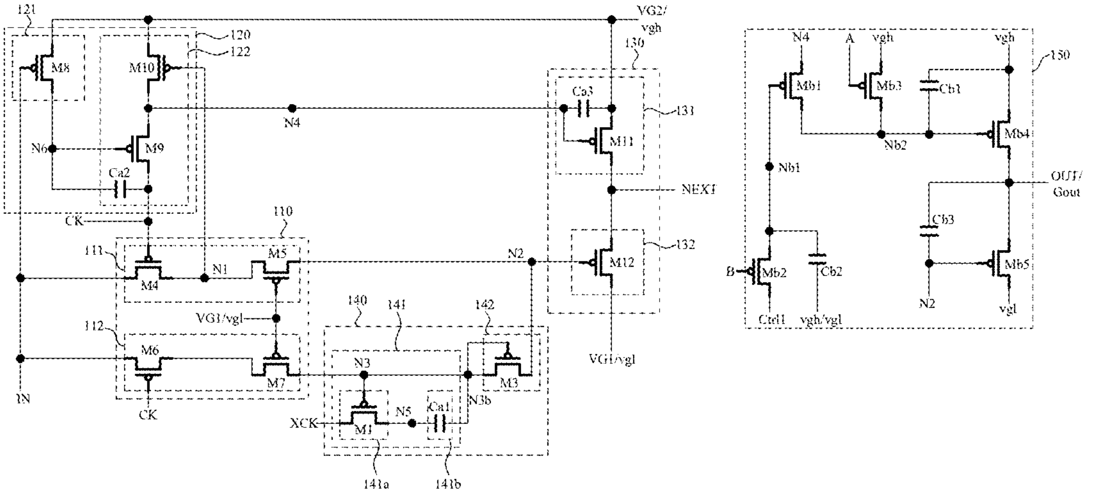
FIG. 11 shows a schematic view of yet another shift register provided in embodiments of the present application.

FIG. 11 shows a schematic view of yet another shift register provided in embodiments of the present application. As shown in FIG. 11, based on the shift register 12 shown in FIG. 7, the shift register 12 further includes a refresh output section 150. The refresh output section 150 includes a scan output terminal OUT, and is electrically connected to a first refresh signal line. The refresh output section 150 controls the scan output terminal OUT to output a gate drive signal Gout including an active level and an inactive level in response to a first refresh control signal Ctrl1 provided by the first refresh signal line.

Optionally, in this embodiment, the refresh output section 150 has a "5T3C" configuration. Exemplarily, the refresh output section 150 includes transistors, which are the first one Mb1 of the transistors, the second one Mb2 of the transistors, the third one Mb3 of the transistors, the fourth one Mb4 of the transistors, and the fifth one Mb5 of the transistors, and further includes capacitors, which are the first one Cb1 of the capacitors, the second one Cb2 of the capacitors, and the third one Cb3 of the capacitors. Optionally, the transistors in the refresh output section 150 each are a PMOS.

The gate of the transistor Mb1 is electrically connected to the node Nb1, the first terminal of the transistor Mb1 is electrically connected to the fourth node N4, and the second terminal of the transistor Mb1 is electrically connected to the node Nb2.

The gate of the transistor Mb2 is electrically connected to a second control terminal B, which may be any one of the shift output terminal NEXT, the first node N1, the second node N2, the third node N3, and the node N3*b*, the first terminal of the transistor Mb2 is electrically connected to a first refresh signal line to receive the first refresh control signal Ctrl1, and the second terminal is electrically connected to the node Nb1.

The gate of the transistor Mb3 is electrically connected to the first control terminal A, which may be any one of the shift output terminal NEXT, the first node N1, the second node N2, the third node N3, and the node N3*b*, the first terminal of the transistor Mb3 receives the high-level signal vgh, and the second terminal is electrically connected to the node Nb2.

The gate of the transistor Mb4 is electrically connected to the node Nb2, the first terminal of the transistor Mb4 receives the high-level signal vgh, and the second terminal of the transistor Mb4 is electrically connected to the scan output terminal OUT.

The gate of the transistor Mb5 is electrically connected to the node N2, the first terminal of the transistor Mb5 receives the low-level signal vgl, and the second terminal of the transistor Mb5 is electrically connected to the scan output terminal OUT.

One plate of the capacitor Cb1 receives the high-level signal vgh, and the other plate is electrically connected to the node Nb2.

One plate of the capacitor Cb2 receives the high-level signal vgh or the low-level signal vgl, and the other plate of the capacitor Cb2 is electrically connected to the node Nb1.

One plate of the capacitor Cb3 is electrically connected to the second node N2, and the other plate is electrically connected to the scan output terminal OUT.

Based on the shift register 12 shown in FIG. 11, the display panel can achieve multi-zone refresh. Specifically, the display panel has a multi-frequency refresh mode. In the multi-frequency refresh mode, the display area of the display panel includes at least a first display zone and a second display zone; the refresh frequency of the first display zone is a first refresh frequency, the refresh frequency of the second display zone is a second refresh frequency, and the first refresh frequency is less than the second refresh frequency.

Optionally, in the multi-frequency refresh mode, the frequency of the shift signal of the shift register in the first display zone is greater than the frequency of the gate drive signal. In the multi-frequency refresh mode, the frequency of the gate drive signal of the shift register in the first display zone is less than the frequency of the gate drive signal of the shift register in the second display zone. Accordingly, the first display zone operates at low frequency, and the second display zone operates at high frequency. Optionally, in the multi-frequency refresh mode, the frequency of the shift signal of the shift register in the second display zone may be equal to the frequency of the gate drive signal, but is not limited thereto.

Exemplarily, in the multi-frequency refresh mode, the first refresh frequency of the first display zone is 30 Hz, and the second refresh frequency of the second display zone is 120 Hz. Taking for example that the refresh frequency of the display panel is 120 Hz, in the multi-frequency refresh mode, in the first display zone, the frequency of the shift signal of the shift register is 120 Hz, and the frequency of the gate drive signal is 30 Hz; and in the second display zone, the frequency of the shift signal of the shift register is 120 Hz, and the frequency of the gate drive signal is 120 Hz.

Exemplarily, in the multi-frequency refresh mode, the first refresh frequency of the first display zone is 30 Hz, and the second refresh frequency of the second display zone is 60 Hz. Taking for example that the refresh frequency of the display panel is 120 Hz, in the multi-frequency refresh mode, in the first display zone, the frequency of the shift signal of the shift register is 120 Hz, and the frequency of the gate drive signal is 30 Hz; in the second display zone, the frequency of the shift signal of the shift register is 120 Hz, and the frequency of the gate drive signal is 60 Hz.

Optionally, the operation process of the shift register 12 includes a data writing stage and a data holding stage. In the data writing stage, the first refresh control signal Ctrl1 provided by the first refresh signal line to the shift register 12 is at the active level, so that the shift signal of the shift register 12 is at the active level and the gate drive signal Gout is at the active level. In the data holding stage, the first refresh control signal Ctrl1 provided by the first refresh signal line to the shift register 12 is at the inactive level, so that the shift signal of the shift register 12 is at the active level, and the gate drive signal Gout is at the inactive level.

In this embodiment, the operation principle of the shift register 12 is described by taking the example where the active level of the first refresh control signal Ctrl1 is the low level vgl and the inactive level of the first refresh control signal Ctrl1 is the high level vgh. Optionally, the gate of the transistor Mb2 is electrically connected to the shift output terminal NEXT, and the gate of the transistor Mb3 is electrically connected to the second node N2. The high level of the shift signal is an active level, the low level of that is an inactive level, the high level of the gate drive signal Gout is an active level, and the low level of that is an inactive level.

Optionally, in FIG. 11, the second control terminal B is the shift output terminal NEXT, and the first control terminal A is the second node N2.

Figure 12:
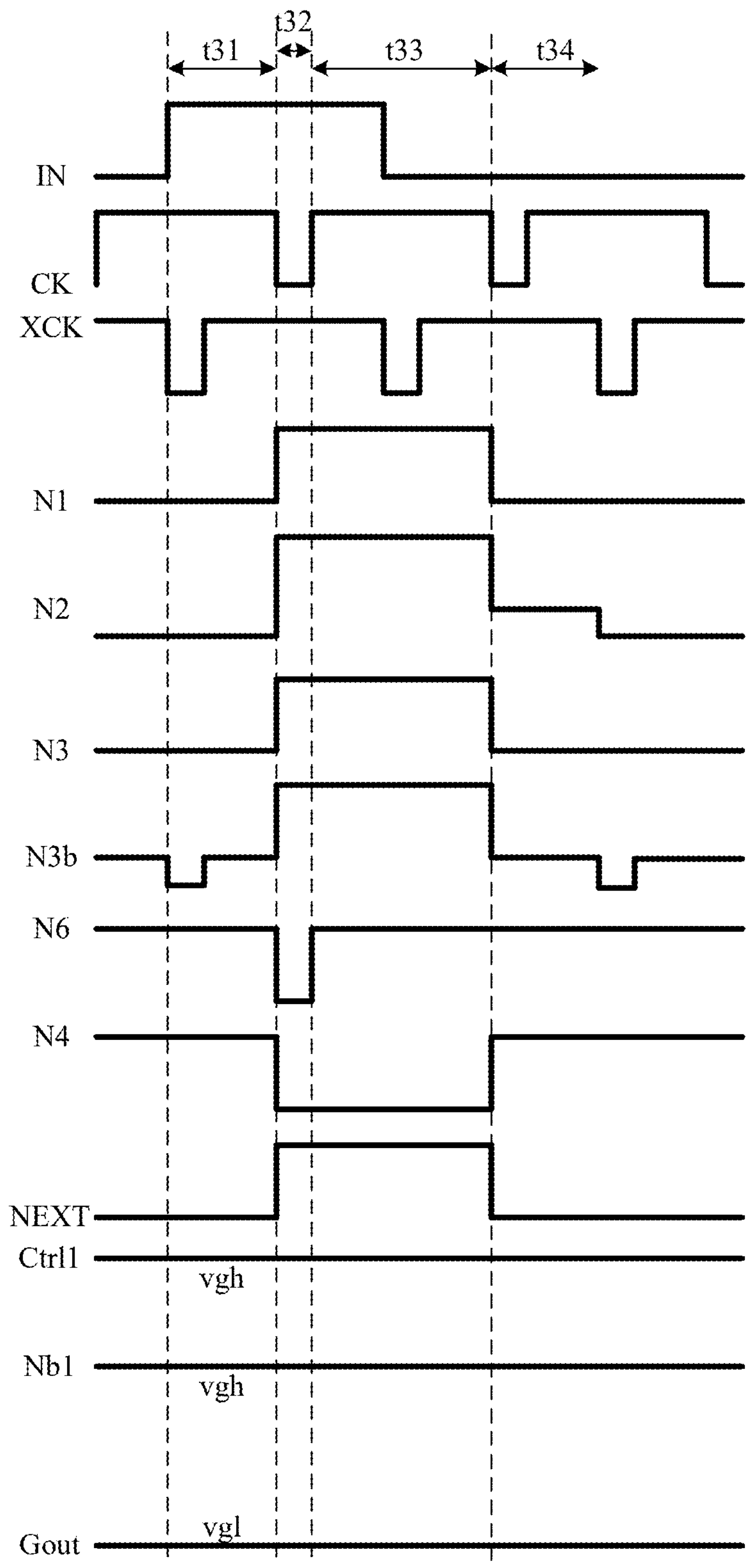
FIG. 12 shows a low-frequency operation timing diagram of the shift register in a first display zone shown in FIG. 11.

FIG. 12 shows a low-frequency operation timing diagram of the shift register in the first display zone shown in FIG. 11. Referring to FIGS. 11 and 12, in the first display zone, the shift signal frequency of the shift register 12 is greater than the gate drive signal frequency. Therefore, when the shift signal of the shift register 12 is at the active level, there is an instance where the gate drive signal of the shift register 12 is at the inactive level, thereby achieving low-frequency operation. Based on this, for the operation of the shift register 12 in the first display zone shown in FIG. 11, in the stages t32 to t33, the first refresh control signal Ctrl1 is at the high level vgh, i.e., the inactive level, so that the shift register 12 satisfies the condition that the shift signal is at the active level and the gate drive signal is at the inactive level.

Referring to FIGS. 11 and 12, the low-frequency operation process of the shift register 12 includes the following.

In the stage t31, the second node N2 is at the low level, and the first power supply signal vgl provided by the first power supply terminal VG1 is transmitted to the shift output terminal NEXT; the transistor Mb2 and the transistor Mb3 are turned on; the node Nb1 is at the high level, and the transistor Mb1 is turned off; the node Nb2 is at the high level, and the transistor Mb4 is turned off, and the transistor Mb5 is turned on, and the gate drive signal Gout output by the scan output terminal OUT is at the low level.

In the stages t32 to t33, the second node N2 is at the high level, and the second power supply signal vgh provided by the second power supply terminal VG2 is transmitted to the shift output terminal NEXT; the transistor Mb2 and the transistor Mb3 are turned off, the node Nb1 remains at the high level, and the transistor Mb1 is turned off; the node Nb2 remains high, and the transistor Mb4 is off; and the transistor Mb5 is turned off, and the gate drive signal Gout output by the scan output terminal OUT remains at the low level. It can be seen that in this stage, the shift signal is at the active level, and the gate drive signal Gout is at the inactive level.

In the stage t34 and thereafter, the second node N2 is at the low level, and the first power supply signal vgl provided by the first power supply terminal VG1 is transmitted to the shift output terminal NEXT; the transistor Mb2 is turned on, and the transistor Mb3 is turned on; the node Nb1 is at the high level, and the transistor Mb1 is turned off, the node Nb2 is at the high level, and the transistor Mb4 is turned off; and the transistor Mb5 is turned on, and the gate drive signal Gout output by the scan output terminal OUT is at the low level.

As described above, when the shift register 12 operates in the low-frequency mode, the high-level signal provided by the first refresh signal line can maintain the node Nb1 at the high level vgh and the gate drive signal Gout of the scan output terminal OUT at the low level vgl. This effectively enhances the circuit stability and efficiency of the shift register 12 operating in the low-frequency mode.

Figure 13:
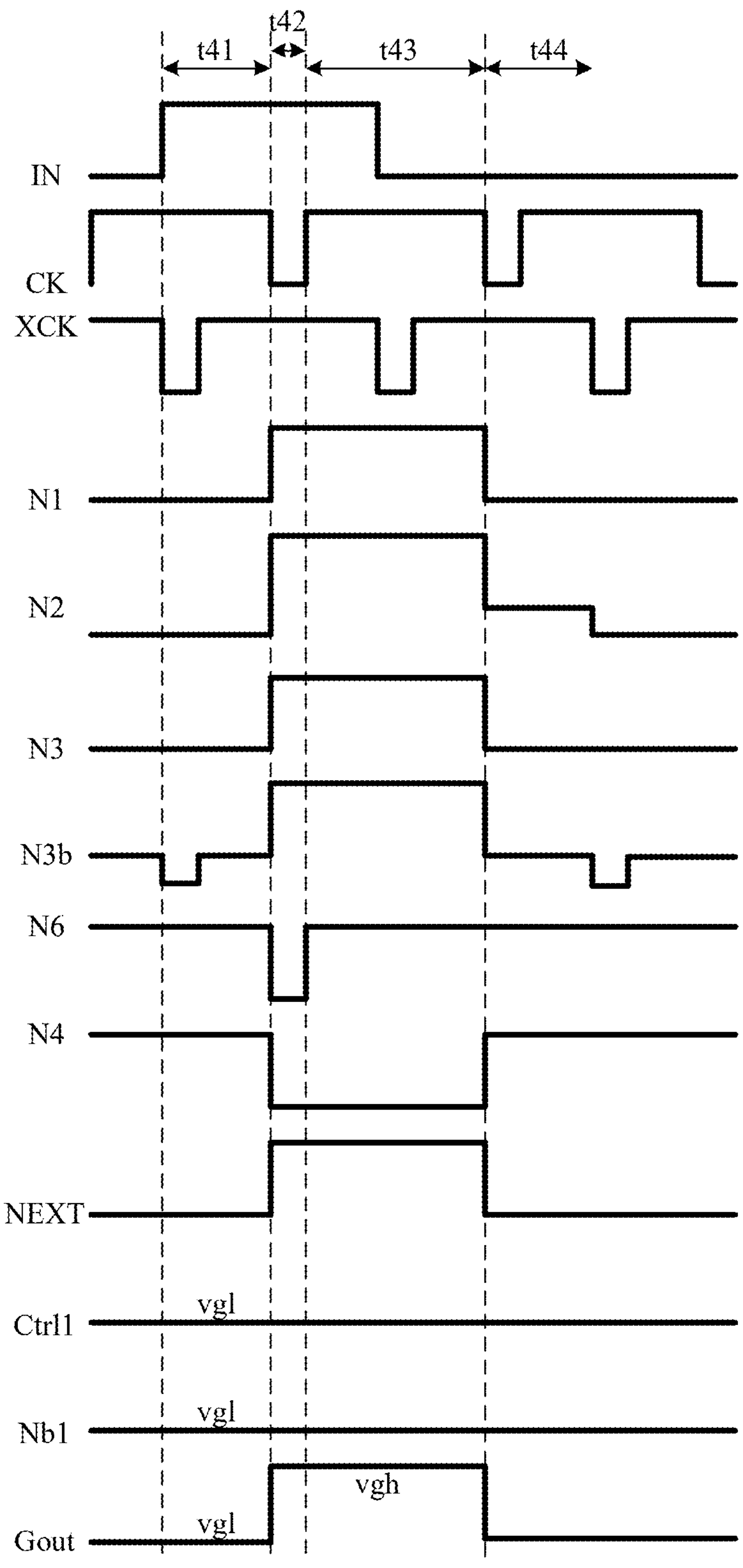
FIG. 13 shows a high-frequency operation timing diagram of the shift register in a second display zone shown in FIG. 11.

FIG. 13 shows a high-frequency operation timing diagram of the shift register in a second display zone shown in FIG. 11. Optionally, referring to FIGS. 11 and 13, in the second display zone, the frequency of the shift signal of the shift register 12 is equal to the frequency of the gate drive signal. Therefore, when the shift signal of the shift register 12 is at the active level, the gate drive signal of the shift register 12 is at the active level, thereby achieving high-frequency operation. Based on this, for the operation of the second display zone in the shift register 12 shown in FIG. 11, in the stages t42 to t43, the first refresh control signal Ctrl1 is at the low level vgl, i.e., the active level, so that the shift register 12 satisfies the condition that the shift signal is at the active level and the gate drive signal is at the active level.

Referring to FIGS. 11 and 13, the high-frequency operation process of the shift register 12 includes the following stages t41 to t44.

In the stage t41, the second node N2 is at the low level, and the first power supply signal vgl provided by the first power supply terminal VG1 is transmitted to the shift output terminal NEXT; the transistor Mb2 is turned on, and the transistor Mb3 is turned on; the node Nb1 is at the low level, and the transistor Mb1 is turned on; the node Nb2 is at the high level, and the transistor Mb4 is turned off, and the transistor Mb5 is turned on, and the gate drive signal Gout output by the scan output terminal OUT is at the low level.

In the stages t42 to t43, the second node N2 is at the high level, and the second power supply signal vgh provided by the second power supply terminal VG2 is transmitted to the shift output terminal NEXT; the transistor Mb2 is turned off, and the transistor Mb3 is turned off; the node Nb1 remains at the low level, and the transistor Mb1 is turned on; the node Nb2 is at the low level, and the transistor Mb4 is turned on; the transistor Mb5 is turned off, and the gate drive signal Gout output by the scan output terminal OUT is at the high level. It can be seen that in this stage, the shift signal is at the active level, and the gate drive signal Gout is at the active level.

In the stage t44 and thereafter, the second node N2 is at the low level, and the first power supply signal vgl provided by the first power supply terminal VG1 is transmitted to the shift output terminal NEXT; the transistor Mb2 is turned on, and the transistor Mb3 is turned on; the node Nb1 is at the low level, and the transistor Mb1 is turned on; the node Nb2 is at the high level, and the transistor Mb4 is turned off; the transistor Mb5 is turned on, and the gate drive signal Gout output by the scan output terminal OUT is at the low level.

As described above, when the shift register 12 operates in the high-frequency mode, the circuit stability and efficiency of the shift register 12 operating in the high-frequency mode can be enhanced.

Figure 14:
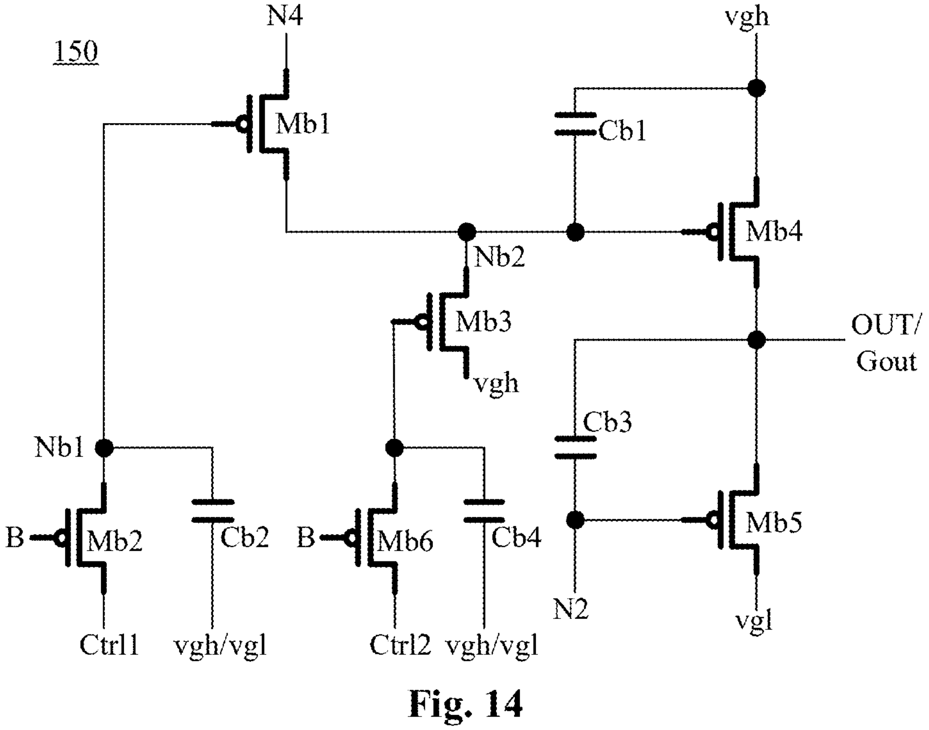
FIG. 14 shows a schematic view of a refresh output section in yet another shift register provided in embodiments of the present application.

FIG. 14 shows a schematic view of a refresh output section in yet another shift register provided in embodiments of the present application. Optionally, the difference from FIG. 11 is that a refresh output section 150 shown in FIG. 14 has a "6T4C" configuration and comprises two refresh signal lines. Only the refresh output section 150 in the shift register 12 is shown in FIG. 14, and other structures of the shift register 12 may be shown with reference to FIG. 11 and are not repeated here.

Specifically, the refresh output section 150 includes a transistor Mb1, a transistor Mb2, a transistor Mb4, a transistor Mb5, a capacitor Cb1, a capacitor Cb2, and a capacitor Cb3, and the connection manners of the four transistors and the three capacitors are the same as those in FIG. 11.

The difference from FIG. 11 is that the refresh output section 150 further includes a transistor Mb31, a transistor Mb6, and a fourth capacitor Cb4. The gate of the transistor Mb6 is electrically connected to a second control terminal B, which may be any one of the shift output terminal NEXT, the first node N1, the second node N2, the third node N3, and the node N3*b*, the first terminal of the transistor Mb6 is electrically connected to a second refresh signal line to receive a second refresh control signal Ctrl2, and the second terminal of the transistor Mb6 is electrically connected to the gate of the transistor Mb31. The first plate of the capacitor Cb4 is electrically connected to the gate of the transistor Mb31, and the second plate of the capacitor Cb4 may receive the high-level signal vgh or the low-level signal vgl. The first terminal of the transistor Mb31 receives the high-level signal vgh, and the second terminal of the transistor Mb31 is electrically connected to the node Nb2.

Optionally, the second refresh control signal Ctrl2 provided by the second refresh signal line is different from the first refresh control signal Ctrl1 provided by the first refresh signal line. Optionally, the second refresh control signal Ctrl2 provided by the second refresh signal line and the first refresh control signal Ctrl1 provided by the first refresh signal line each are the signal toggling between the high level and the low level, and are in opposite phases.

Optionally, in FIG. 14, the second control terminal B is the shift output terminal NEXT.

Based on the shift register 12 shown in FIG. 14, the display panel can achieve zone refresh.

Figure 15:
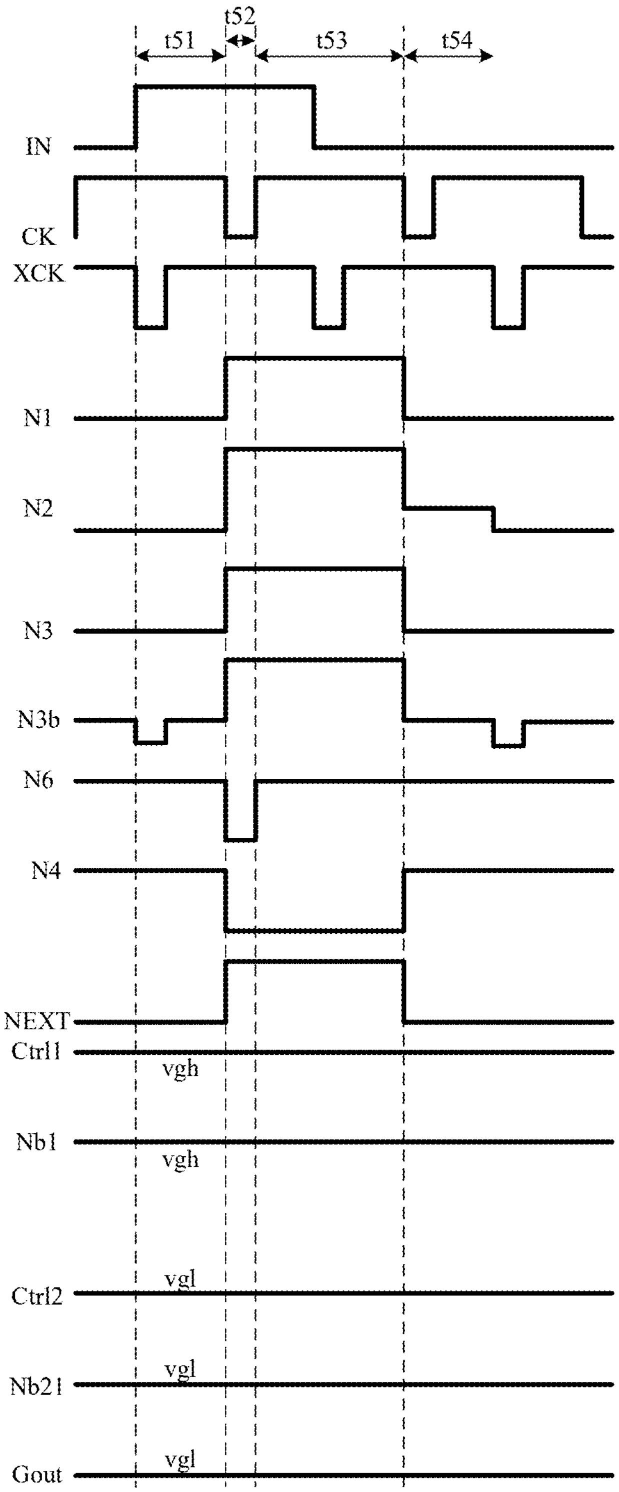
FIG. 15 shows a low-frequency operation timing diagram of the shift register in a first display zone shown in FIG. 14.

FIG. 15 shows a low-frequency operation timing diagram of the shift register in a first display zone shown in FIG. 14. Referring to FIGS. 14 and 15, in the first display zone, the shift signal frequency of the shift register 12 is greater than the gate drive signal frequency. Therefore, when the shift signal of the shift register 12 is at the active level, the gate drive signal of the shift register 12 is at the inactive level, thereby achieving low-frequency operation. Based on this, for the operation of the shift register 12 in the first display zone shown in FIG. 14, in the stages t52 to t53, the first refresh control signal Ctrl1 is at the high level vgh, i.e., the inactive level, the second refresh control signal Ctrl2 is at the low level vgl, i.e., the active level, so that the shift register 12 satisfies the condition that the shift signal is at the active level and the gate drive signal is at the inactive level.

Referring to FIGS. 14 and 15, the low-frequency operation process of the shift register 12 includes the following stages t51 to t54.

In the stage t51, the second node N2 is at the low level, and the first power supply signal vgl provided by the first power supply terminal VG1 is transmitted to the shift output terminal NEXT; the transistor Mb2 is turned on, the high level vgh of the first refresh control signal Ctrl1 is written to the node Nb1, and the transistor Mb1 is turned off; the transistor Mb6 is turned on, the low level vgl of the second refresh control signal Ctrl2 is written to the node Nb21, and the transistor Mb31 is turned on; the node Nb2 is at the high level, and the transistor Mb4 is turned off, and the transistor Mb5 is turned on, and the gate drive signal Gout output by the scan output terminal OUT is at the low level vgl.

In the stages t52 to t53, the second node N2 is at the high level, and the second power supply signal vgh provided by the second power supply terminal VG2 is transmitted to the shift output terminal NEXT; the transistor Mb2 is turned off, and the transistor Mb6 is turned off; the node Nb1 remains at the high level, and the transistor Mb1 is turned off; the node Nb21 remains at the low level, and the transistor Mb31 is turned on; the node Nb2 remains at the high level, and the transistor Mb4 is turned off; the transistor Mb5 is turned off, and the gate drive signal Gout output by the scan output terminal OUT remains at the low level. It can be seen that in this stage, the shift signal is at the active level, and the gate drive signal Gout is at the inactive level.

In the stage t54 and thereafter, the second node N2 is at the low level, and the first power supply signal vgl provided by the first power supply terminal VG1 is transmitted to the shift output terminal NEXT; the transistor Mb2 is turned on, and the transistor Mb6 is turned on; the node Nb1 is at the high level, and the transistor Mb1 is turned off; the node Nb21 is at the low level, and the transistor Mb31 is turned on; the node Nb2 is at the high level, and the transistor Mb4 is turned off, the transistor Mb5 is turned on, and the gate drive signal Gout output by the scan output terminal OUT is at the low level.

As described above, when the shift register 12 is operated in the low-frequency mode, the high-level signal provided by the first refresh signal line can maintain the node Nb1 at the high level vgh, and the low-level signal provided by the second refresh signal line can maintain the node Nb21 at the low level vgl. Correspondingly, the turned-on transistor Mb31 maintains the node Nb2 at the high level, and the transistor Mb4 remains turned off, so that the gate drive signal Gout of the scan output terminal OUT remains at the low level vgl. This effectively enhances the stability and efficiency of the circuit when the shift register 12 operates in the low-frequency mode.

Figure 16:
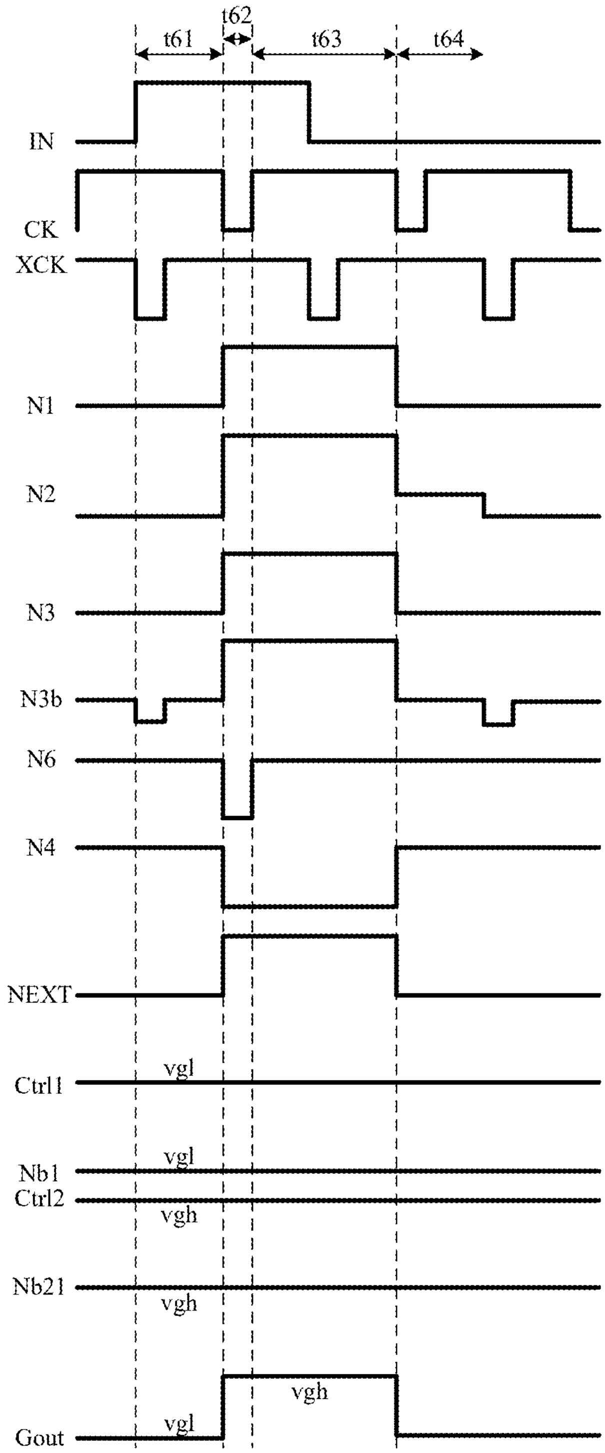
FIG. 16 shows a high-frequency operation timing diagram of the shift register in a second display zone shown in FIG. 14.

FIG. 16 shows a high-frequency operation timing diagram of the shift register in a second display zone shown in FIG. 14. Optionally, referring to FIGS. 14 and 16, in the second display zone, the shift signal frequency of the shift register 12 is equal to the gate drive signal frequency. Therefore, when the shift signal of the shift register 12 is at the active level, the gate drive signal of the shift register 12 is at the active level, thereby achieving high-frequency operation. Based on this, for the operation of the shift register 12 in the first display zone shown in FIG. 14, in the stages t62 to t63, the first refresh control signal Ctrl1 is at the low level vgl, i.e., the active level, the second refresh control signal Ctrl2 is at the high level vgh, i.e., the inactive level, so that the shift register 12 satisfies the condition that the shift signal is at the active level and the gate drive signal is at the active level.

Referring to FIGS. 14 and 16, the high-frequency operation process of the shift register 12 includes the following stages t61 to t64.

In the stage t61, the second node N2 is at the low level, and the first power supply signal vgl provided by the first power supply terminal VG1 is transmitted to the shift output terminal NEXT; the transistor Mb2 is turned on, the low level vgl of the first refresh control signal Ctrl1 is written to the node Nb1, and the transistor Mb1 is turned on, the high level of the fourth node N4 is written to the node Nb2, the transistor Mb6 is turned on, the high level vgh of the second refresh control signal Ctrl2 is written to the node Nb21, and the transistor Mb31 is turned off; the node Nb2 is at the high level, and the transistor Mb4 is turned off; the transistor Mb5 is turned on, and the gate drive signal Gout output by the scan output terminal OUT is at the low level vgl.

In the stages t62 to t63, the second node N2 is at the high level, and the second power supply signal vgh provided by the second power supply terminal VG2 is transmitted to the shift output terminal NEXT; the transistor Mb2 is turned off, and the transistor Mb6 is turned off; the node Nb1 remains at the low level, and the transistor Mb1 is turned on; the node Nb21 remains at the high level, and the transistor Mb31 is turned off; the low level of the fourth node N4 is written to the node Nb2, and the transistor Mb4 is turned on; the transistor Mb5 is turned off, and the gate drive signal Gout output by the scan output terminal OUT is at the high level. It can be seen that in this stage, the shift signal is at the active level, and the gate drive signal Gout is at the active level.

In the stage t64 and thereafter, the second node N2 is at the low level, and the first power supply signal vgl provided by the first power supply terminal VG1 is transmitted to the shift output terminal NEXT; the transistor Mb2 is turned on, and the transistor Mb6 is turned on; the node Nb1 is at the low level, and the transistor Mb1 is turned on; the node Nb21 is at the high level, and the transistor Mb31 is turned off; the high level of the fourth node N4 is written to the node Nb2, and the transistor Mb4 is turned off; and the transistor Mb5 is turned on, and the gate drive signal Gout output by the scan output terminal OUT is at the low level.

As described above, when the shift register 12 operates in the high-frequency mode, the stability and efficiency of the circuit may be enhanced when the shift register 12 operates in the high-frequency mode.

Figure 17:
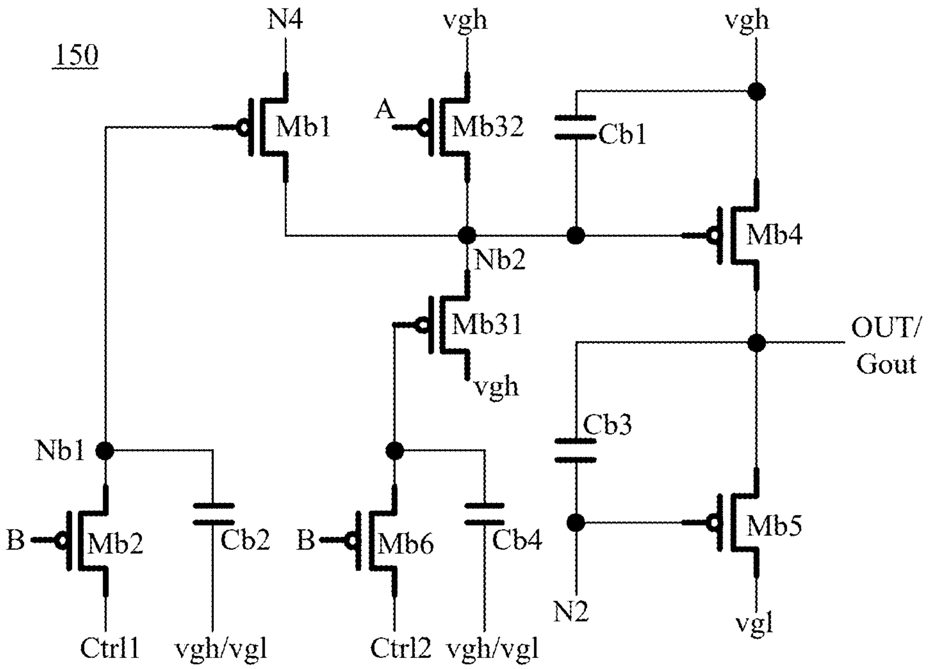
FIG. 17 shows a schematic view of a refresh output section in yet another shift register provided in embodiments of the present application.

FIG. 17 shows a schematic view of a refresh output section in yet another shift register provided in embodiments of the present application. Optionally, the difference from FIG. 14 is that a refresh output section 150 shown in FIG. 17 has a "7T4C" configuration. Only the refresh output section 150 in the shift register 12 is shown in FIG. 17, and other structures of the shift register 12 may be shown with reference to FIG. 11, and are not repeated here.

Specifically, the refresh output section 150 includes a transistor Mb1, a transistor Mb2, a transistor Mb31, a transistor Mb4, a transistor Mb5, a transistor Mb6, a capacitor Cb1, a capacitor Cb2, a capacitor Cb3, and a capacitor Cb4, and the connection manners of the six transistors and the four capacitors are the same as those in FIG. 14.

The difference from FIG. 14 is that a transistor Mb32 is added in the refresh output section 150, the gate of the transistor Mb32 is electrically connected to the first control terminal A, which may be any one of the shift output terminal NEXT, the first node N1, the second node N2, the third node N3, and the node N3*b*, the first terminal of the transistor Mb32 receives the high-level signal vgh, and the second terminal of the transistor Mb32 is electrically connected to the node Nb2.

The low-frequency operation timing of the shift register shown in FIG. 17 may be with reference to FIG. 15; and the high-frequency operation timing of the shift register shown in FIG. 17 may be with reference to FIG. 16.

The inventors have found that the refresh output section suitable for the shift register according to the present application is not limited to the above configuration, and under the premise of ensuring the normal operation and the stable and effective output of the shift register, any refresh output section falls within the scope of the present application, which is not repeated herein.

Based on the same inventive concept, the embodiments of the present application further provide a display apparatus which includes the display panel according to the embodiments of the present application. Therefore, the display apparatus has the technical features of the display panel according to the embodiments of the present application and can achieve beneficial effects of the display panel according to the embodiments of the present application, and for common features, reference may be made to the above description of the display panel according to the embodiments of the present application, which is not be repeated here.

Figure 18:
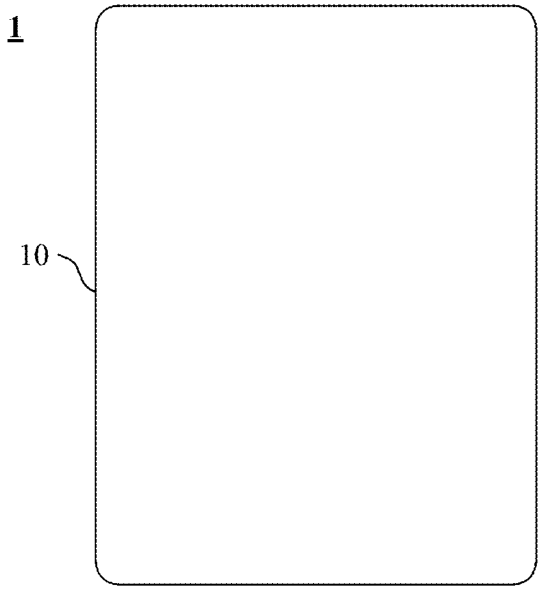
FIG. 18 shows a schematic structural view of a display apparatus provided in embodiments of the present application.

Exemplarily, FIG. 18 shows a schematic structural view of a display apparatus provided in embodiments of the present application, and as shown in FIG. 18, the display apparatus 1 includes the display panel 10 provided in embodiments of the present application. The display apparatus provided in embodiments of the present application may be any electronic product with the display function, including, but not limited to, the following categories: mobile phones, televisions, notebook computers, desktop displays, tablet computers, digital cameras, smart bracelets, smart glasses, vehicle-mounted displays, medical equipment, industrial control equipment, touch interactive terminals, and the like, which are not specifically limited in the embodiments of the present application.

It should be understood that the steps may be reordered, added, or deleted using the various forms of flows shown above. For example, the steps described in the present application may be executed in parallel, in sequence, or in different orders as long as the desired results of the technical solutions of the present application can be achieved, which is not limited herein.

The above-described specific embodiments do not limit the scope of protection of the present application. It will be understood by those skilled in the art that, various modifications, combinations, sub-combinations, and substitutions may be made depending on design requirements and other factors. Any modification, equivalent substitution and improvement made within the spirit and principle of the present application should be included within the scope of protection of the present application.

What is claimed is:

1. A display panel comprising a first driving circuit comprising a plurality of stages of shift registers, each of the shift registers comprising:

a first shift control module electrically connected to an input terminal, a first clock terminal, a first power supply terminal, a first node, a second node, and a third node, the first shift control module being configured to control a signal of the first node, a signal of the second node, and a signal of the third node;

a second shift control module electrically connected to the input terminal, the first clock terminal, the first node, a second power supply terminal, and a fourth node, the second shift control module being configured to control a signal of the fourth node;

a shift output module electrically connected to the fourth node, the second node, the first power supply terminal, the second power supply terminal, and a shift output terminal, the shift output module being configured to control the shift output terminal to output a shift signal;

a potential control module electrically connected to the third node, a second clock terminal, and the second node, the potential control module being configured to control the signal of the second node; and a refresh output section comprising a scan output terminal, the refresh output section being electrically connected to a first refresh signal line and configured to control the scan output terminal to output a gate drive signal.

2. The display panel according to claim 1, wherein the potential control module comprises:

a first potential control sub-module electrically connected to the second clock terminal and the third node, the first potential control sub-module being configured to control the signal of the third node; and a second potential control sub-module electrically connected to the third node and the second node, the second potential control sub-module being configured to control the signal of the second node.

3. The display panel according to claim 2, wherein the first potential control sub-module comprises:

a first potential control unit electrically connected to the second clock terminal, the third node, and a fifth node, the first potential control unit being configured to control a signal of the fifth node; and a first coupling unit, a first terminal of the first coupling unit being electrically connected to the fifth node, and a second terminal of the first coupling unit being electrically connected to the third node.

4. The display panel according to claim 3, wherein the first potential control unit comprises a first transistor, a gate of the first transistor being electrically connected to the third node, a first terminal of the first transistor being electrically connected to the second clock terminal, and a second terminal of the first transistor being electrically connected to the fifth node.

5. The display panel according to claim 3, wherein the first coupling unit comprises a first capacitor, a first plate of the first capacitor being electrically connected to the fifth node, and a second plate of the first capacitor being electrically connected to the third node.

6. The display panel according to claim 1, wherein a phase of a first clock signal provided by the first clock terminal is different from a phase of a second clock signal provided by the second clock terminal.

7. The display panel according to claim 6, wherein a period of the first clock signal is equal to a period of the second clock signal.

8. The display panel according to claim 7, wherein a phase difference between the first clock signal and the second clock signal is 2/H, where H is the period of the first clock signal.

9. The display panel according to claim 3, wherein the first potential control sub-module comprises a second potential control unit electrically connected to the fourth node, a third power supply terminal, and the fifth node, the second potential control unit being configured to control the signal of the fifth node.

10. The display panel according to claim 9, wherein the second potential control unit comprises a second transistor, a gate of the second transistor being electrically connected to the fourth node, a first terminal of the second transistor being electrically connected to the third power supply terminal, and a second terminal of the second transistor being electrically connected to the fifth node.

11. The display panel according to claim 9, wherein a third power supply signal provided by the third power supply terminal is a fixed voltage signal.

12. The display panel according to claim 11, wherein the second power supply signal provided by the second power supply terminal is the same as the third power supply signal.

13. The display panel according to claim 2, wherein the second potential control sub-module comprises a third transistor, a gate and a first terminal of the third transistor each being connected to the third node, and a second terminal of the third transistor being electrically connected to the second node.

14. The display panel according to claim 1, wherein the first shift control module comprises:

a first shift control sub-module electrically connected to the input terminal, the first clock terminal, the first power supply terminal, the first node, and the second node, the first shift control sub-module being configured to control the signal of the first node and the signal of the second node; and a second shift control sub-module electrically connected to the input terminal, the first clock terminal, the first power supply terminal, and the third node, the second shift control sub-module being configured to control the signal of the third node;

wherein the first shift control sub-module comprises:

a fourth transistor, a gate of the fourth transistor being electrically connected to the first clock terminal, a first terminal of the fourth transistor being electrically connected to the input terminal, and a second terminal of the fourth transistor being electrically connected to the first node; and a fifth transistor, a gate of the fifth transistor being electrically connected to the first power supply terminal, a first terminal of the fifth transistor being electrically connected to the first node, and a second terminal of the fifth transistor being electrically connected to the second node;

wherein the second shift control sub-module comprises:

a sixth transistor, a gate of the sixth transistor being electrically connected to the first clock terminal, a first terminal of the sixth transistor being electrically connected to the input terminal, and a second terminal of the sixth transistor being electrically connected to a first terminal of a seventh transistor; and the seventh transistor, a gate of the seventh transistor being electrically connected to the first power supply terminal, and a second terminal of the seventh transistor being electrically connected to the third node.

15. The display panel according to claim 1, wherein the second shift control module comprises:

a third shift control sub-module electrically connected to the input terminal, the second power supply terminal, and a sixth node, the third shift control sub-module being configured to control a signal of the sixth node; and a fourth shift control sub-module electrically connected to the sixth node, the first clock terminal, the second power supply terminal, the first node, and the fourth node, the fourth shift control sub-module being configured to control the signal of the fourth node;

wherein the third shift control sub-module comprises an eighth transistor, a gate of the eighth transistor being electrically connected to the input terminal, a first terminal of the eighth transistor being electrically connected to the second power supply terminal, and a second terminal of the eighth transistor being electrically connected to the sixth node;

wherein the fourth shift control sub-module comprises:

a ninth transistor, a gate of the ninth transistor being electrically connected to the sixth node, a first terminal of the ninth transistor being electrically connected to the first clock terminal, and a second terminal of the ninth transistor being electrically connected to the fourth node; and a tenth transistor, a gate of the tenth transistor being electrically connected to the first node, a first terminal of the tenth transistor being electrically connected to the second power supply terminal, and a second terminal of the tenth transistor being electrically connected to the fourth node;

wherein the fourth shift control sub-module comprises a second capacitor, a first plate of the second capacitor being electrically connected to the sixth node, and a second plate of the second capacitor being electrically connected to the first clock terminal.

16. The display panel according to claim 1, wherein the shift output module comprises:

a first output sub-module electrically connected to the fourth node, the second power supply terminal, and the shift output terminal, the first output sub-module being configured to control the shift output terminal to output the shift signal; and a second output sub-module electrically connected to the second node, the first power supply terminal, and the shift output terminal, the second output sub-module being configured to control the shift output terminal to output the shift signal.

17. The display panel according to claim 16, wherein the first output sub-module comprises:

an eleventh transistor, a gate of the eleventh transistor being electrically connected to the fourth node, a first terminal of the eleventh transistor being electrically connected to the second power supply terminal, and a second terminal of the eleventh transistor being electrically connected to the shift output terminal; and a third capacitor, a first plate of the third capacitor being electrically connected to the fourth node, and a second plate of the third capacitor being electrically connected to the second power supply terminal.

18. The display panel according to claim 17, wherein the second output sub-module comprises a twelfth transistor, a gate of the twelfth transistor being electrically connected to the second node, a first terminal of the twelfth transistor being electrically connected to the first power supply terminal, and a second terminal of the twelfth transistor being electrically connected to the shift output terminal;

wherein the second output sub-module comprises a fourth capacitor, a first plate of the fourth capacitor being electrically connected to the second node, and a second plate of the fourth capacitor being electrically connected to the shift output terminal.

19. The display panel according to claim 1, wherein an operation process of the shift register comprises a first stage, in which a transmission path between the first power supply terminal and the shift output terminal in the shift output module is controlled to be conductive, so that a first power supply signal provided by the first power supply terminal is transmitted to the shift output terminal; and a second stage, in which a transmission path between the second power supply terminal and the shift output terminal in the shift output module is controlled to be conductive, so that a second power supply signal provided by the second power supply terminal is transmitted to the shift output terminal;

wherein the second clock signal provided by the second clock terminal toggles between a first level signal and a second level signal;

in the first stage, under a condition that the second clock signal toggles to the first level signal, the potential control module is controlled to be turned on, and under a condition that the second clock signal toggles to the second level signal, the potential control module is controlled to be turned off, the first level signal has a same polarity as the signal of the second node, and the second level signal has an opposite polarity to the signal of the second node; and in the second stage, the potential control module is turned off.

20. A display apparatus, comprising a display panel which comprises a first driving circuit, the first driving circuit comprising a plurality of stages of shift registers, each of the shift registers comprising:

a first shift control module electrically connected to an input terminal, a first clock terminal, a first power supply terminal, a first node, a second node, and a third node, the first shift control module being configured to control a signal of the first node, a signal of the second node, and a signal of the third node;

a second shift control module electrically connected to the input terminal, the first clock terminal, the first node, a second power supply terminal, and a fourth node, the second shift control module being configured to control a signal of the fourth node;

a shift output module electrically connected to the fourth node, the second node, the first power supply terminal, the second power supply terminal, and a shift output terminal, the shift output module being configured to control the shift output terminal to output a shift signal;

a potential control module electrically connected to the third node, a second clock terminal, and the second node, the potential control module being configured to control the signal of the second node; and a refresh output section comprising a scan output terminal, the refresh output section being electrically connected to a first refresh signal line and configured to control the scan output terminal to output a gate drive signal.

* * * * *